(12) United States Patent
Goss et al.

(10) Patent No.: US 7,783,755 B2
(45) Date of Patent: *Aug. 24, 2010

(54) CONTACT SERVER FOR CALL CENTER

(75) Inventors: Raymond G. Goss, Austin, TX (US);
Donald Ravenscroft, Colorado Springs, CO (US)

(73) Assignee: MCI Communications Corporation, Ashburn, VA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 10/648,427

(22) Filed: Aug. 27, 2003

(65) Prior Publication Data

US 2004/0039846 A1    Feb. 26, 2004

Related U.S. Application Data

(60) Continuation of application No. 09/417,327, filed on Oct. 13, 1999, now Pat. No. 6,654,815, which is a division of application No. 08/976,162, filed on Nov. 21, 1997, now Pat. No. 6,493,447.

(51) Int. Cl.
*G06F 15/173* (2006.01)
(52) U.S. Cl. .................. 709/225; 709/226; 709/227
(58) Field of Classification Search .......... 709/225–227
See application file for complete search history.

(56) References Cited

U.S. PATENT DOCUMENTS

| | | |
|---|---|---|
| 5,155,761 A | 10/1992 | Hammond |
| 5,185,782 A | 2/1993 | Srinivasan |
| 5,206,903 A | 4/1993 | Kohler et al. |
| 5,268,957 A | 12/1993 | Albrecht |
| 5,311,574 A | 5/1994 | Livanos |
| 5,384,841 A | 1/1995 | Adams et al. |

(Continued)

FOREIGN PATENT DOCUMENTS

| | | |
|---|---|---|
| EP | 0 856 980 | 8/1998 |
| WO | 98/54877 | 12/1998 |

OTHER PUBLICATIONS

Webline Comm. Debuts Powerful Software Solution or Interactive Telebusiness, Press Release [Online]. WebLine Comm. Corp., Sep. 8, 1997 [retrieved on Nov. 5, 1999]. Retrieved from the Internet: <URL:http:/www.webline.com/news/press/1997/9-8-97.htm>.
Harry Newton, Newton's Telecom Dictionary, Nov. 1994, Flatiron Publishing Inc., 8$^{th}$ Ed., pp. 106, 297, 298 and 920 IBSN 0-936648-60-0.

(Continued)

*Primary Examiner*—Krisna Lim

(57) ABSTRACT

The present invention is a Contact Server that enables customers to submit call-back requests to a call center via the Internet, or virtually any other communications technology available. A call-back to the customer can be placed via any communications technology available. In its preferred embodiment, the Contact Server enables a call-back request to be submitted by a customer directly from an HTML page on a Web site, and have that same HTML page be presented to the agent that receives the call-back request. The agent can then place a telephone call to the number provided by the customer who submitted the call-back request, and at the same time, establish a TCP/IP communications session with the customer. This TCP/IP session can proceed between the agent's Web browser and the customer's Web browser, and the visible actions performed by the agent are transferred to the customer and displayed on the customer's browser. The TCP/IP session proceeds simultaneous with the telephone call between the agent and the customer.

11 Claims, 15 Drawing Sheets

U.S. PATENT DOCUMENTS

| | | | |
|---|---|---|---|
| 5,533,100 A | 7/1996 | Bass et al. | |
| 5,535,256 A | 7/1996 | Maloney et al. | |
| 5,590,188 A | 12/1996 | Crockett | |
| 5,602,846 A | 2/1997 | Holmquist et al. | |
| 5,625,682 A | 4/1997 | Gray et al. | |
| 5,692,033 A | 11/1997 | Farris | |
| 5,742,674 A | 4/1998 | Jain et al. | |
| 5,754,830 A | 5/1998 | Butts et al. | |
| 5,761,289 A | 6/1998 | Keshav | |
| 5,761,507 A | 6/1998 | Govett | |
| 5,778,060 A | 7/1998 | Otto | |
| 5,781,909 A | 7/1998 | Logan et al. | |
| 5,793,861 A | 8/1998 | Haigh | |
| 5,825,869 A | 10/1998 | Brooks et al. | |
| 5,826,014 A | 10/1998 | Coley et al. | |
| 5,838,682 A | 11/1998 | Dekelbaum et al. | |
| 5,884,032 A | 3/1999 | Bateman et al. | |
| 5,894,554 A * | 4/1999 | Lowery et al. | 709/203 |
| 5,907,547 A | 5/1999 | Foladare et al. | |
| 5,907,681 A * | 5/1999 | Bates et al. | 709/228 |
| 5,926,538 A | 7/1999 | Deryugin et al. | |
| 5,933,492 A | 8/1999 | Turovski | |
| 5,933,827 A * | 8/1999 | Cole et al. | 707/10 |
| 5,954,798 A | 9/1999 | Shelton et al. | |
| 5,995,614 A | 11/1999 | Miloslavsky | |
| 6,006,260 A * | 12/1999 | Barrick et al. | 709/224 |
| 6,021,428 A | 2/2000 | Miloslavsky | |
| 6,035,332 A | 3/2000 | Ingrassia, Jr. et al. | |
| 6,049,602 A | 4/2000 | Foladare et al. | |
| 6,049,779 A | 4/2000 | Berkson | |
| 6,052,710 A * | 4/2000 | Saliba et al. | 709/203 |
| 6,088,441 A | 7/2000 | Flockhart et al. | |
| 6,112,242 A * | 8/2000 | Jois et al. | 709/225 |
| 6,130,933 A | 10/2000 | Miloslavsky | |
| 6,163,536 A | 12/2000 | Dunn et al. | |
| 6,188,673 B1 | 2/2001 | Bauer et al. | |
| 6,192,050 B1 | 2/2001 | Stovall | |
| 6,229,888 B1 | 5/2001 | Miloslavsky | |
| 6,230,196 B1 * | 5/2001 | Guenthner et al. | 709/223 |
| 6,295,551 B1 | 9/2001 | Roberts et al. | |
| 6,337,858 B1 | 1/2002 | Petty et al. | |
| 6,381,645 B1 | 4/2002 | Sassin | |
| 6,411,805 B1 | 6/2002 | Becker et al. | |
| 6,421,717 B1 | 7/2002 | Kloba et al. | |
| 6,493,447 B1 | 12/2002 | Goss et al. | |
| 6,573,911 B2 | 6/2003 | Brockbank | |
| 6,597,377 B1 * | 7/2003 | MacPhail | 345/738 |
| 6,625,139 B2 | 9/2003 | Miloslavsky et al. | |
| 6,654,815 B1 * | 11/2003 | Goss et al. | 709/248 |
| 6,665,395 B1 | 12/2003 | Busey et al. | |
| 6,760,727 B1 | 7/2004 | Schroeder et al. | |

OTHER PUBLICATIONS

Gawrys et al., "ISDN: Integrated Network/Premises Solutions", Integrating the World Through Communications, Toronto, Canada, Jun. 22-25, 1986, International Conference on Communications, New York, IEEE, US, vol. 1, Jun. 22, 1986, pp. 1-5.

* cited by examiner

CONTACT SERVER FOR CALL CENTER

This application is a continuation of U.S. patent application Ser. No. 09/417,327, filed on Oct. 13, 1999, which is now U.S. Pat. No. 6,654,815, which is a divisional of U.S. patent application Ser. No. 08/976,162, filed on Nov. 21, 1997, which is now U.S. Pat. No. 6,493,447. Both applications 09/417,327 and 08/976,162 are hereby incorporated herein by reference.

FIELD OF THE INVENTION

The present invention relates to data communications, and more particularly to customer to company call center communications in the telecommunications industry.

BACKGROUND OF THE INVENTION

In the telecommunications industry, call centers are used to provide customer and operator services for business clients. Traditionally, customers of these business clients place a phone call to a toll-free telephone number to reach a call center customer service agent. They are then served over the phone. Often, because of the limited number of agents at a call center and the large number of calls, a customer's call is placed in a queue until an agent becomes available.

Many customers in the telecommunications industry interact with the Internet and World Wide Web, and use the Web for a variety of business services. This presents a business opportunity to interact with customers who are familiar with browsing the Web, by presenting to the customer a Web site and an opportunity to interact with the telecommunications company. However, the World Wide Web is not an interactive media, and is primarily composed of many static HTML pages at any given Web site.

The customers browsing the Web site may have a need to speak with a customer service agent, either with respect to the Web site and information posted there, or with respect to their transactions with the telecommunications company.

Many companies, including telecommunications companies, maintain call centers to interact with their customers. These call centers may provide order entry clerks for new orders, billing services for resolving problems with invoices, shipments or returns, technical support, and trouble ticketing for customers having a high volume of transactions with the company.

However, given the volume of customer calls, and the company resources available to response to the calls, most calls to the call center are placed on-hold by an ACD (automatic call director), and the initial customer interaction is with an IVR (interactive voice response) unit, which is primarily intended to direct the call to the proper agent, and is not programmed to answer a customer's questions. This frequently leads to aggravated customers who are unable to resolve their concerns in a timely manner.

The only means presently available to contact a company call center agent and not be placed on hold, is to place a telephone call and submit a call-back request via the telephone, or to send an e-mail request to the "web master" of the Web site. Current Web services do not allow call-back requests to be submitted via the Web or other Interactive means.

SUMMARY OF THE PRESENT INVENTION

The present invention is a Contact Server that enables customers to submit call-back requests to a call center via the Internet, or virtually any other communications technology available. In its preferred embodiment, the Contact Server enables a call-back request to be submitted by a customer directly from an HTML page on the companies' Web site, and have that same HTML page be presented to an agent who receives the call-back request. The Contact Server can immediately determine if an agent is available, and if the agent is available, the agent can then place a telephone call to the number provided by the customer who submitted the-call-back request, and at the same time, establish a TCP/IP communications session with the customer. This TCP/IP session can proceed between the agent's Web browser and the customer's Web browser, and the visible actions performed by the agent are transferred to the customer and displayed on the customer's browser. The TCP/IP session proceeds simultaneous with the telephone call between the agent and the customer.

If an agent is not available, the Contact Server can be used to provide call-back services at a later time via telephony, the Web, or virtually any other communications technology. A call-back request can be submitted by the agent to the Contact Server to establish communication with the customer via data communications over the Internet, voice telephony over the Internet, video conference over the Internet, or voice telephony over the PSTN or any other technology available.

It is an object of the present invention to provide a Contact Server that manages call-back services for call center agents in a generic manner, so that any communications network can be used for receiving call-back requests and placing call-backs to customers.

It is another object of the present invention to provide a first data base relating to a customers requirements, resources and entitlements, a second data base relating to the type of support requested in the HTML page in which the call back request is posted, and a third dynamic data base of available call center agents and the presently available skill levels relevant to the requested support.

It is another object of the invention to enable the Contact Server to reserve a qualified agent when it receives a call-back request, based on the skill level of the agent and the requested support. That agent is presented with the call-back information submitted by the customer, as well as the Web page from which the call-back request was placed.

Whether the call back request is satisfied immediately, as for example, when an agent is immediately available to respond to the customers request, or whether the call back comes at a later time period, the agent is thus placed in synch with the customer in the context of their companies' Web site. Once TCP/IP communications are established between the agent and the customer, the agent can perform visible tasks on the agent's Web browser, and the customer can view these tasks. This occurs simultaneously with their telephony conversations.

It is another object of the present invention to enable establishment and maintenance of plural TCP/IP communications paths over the Internet between an agent and a customer. While the preferred embodiment utilizes http and telephony communications, http may be combined with chat or smtp to provide simultaneous communications between the customer and agent, and if the customer has a desktop with voice telephony or video telephony, simultaneous communications may proceed with one of these paths as well.

The http communications through the Web site may be enabled and enhanced by Java applets that may be stored on the Web Server that provides the Web site, on the Contact Server, or on a secure data server. These Java applets may then be simultaneously downloaded to and executed on the agent's and customer's Web browsers. The present invention also provides means to synchronize the execution applets on each desktop to ensure that the agent and customer may communicate with respect to the same data.

In a preferred embodiment of the present invention, a data server is provided to poll a company main frame system to obtain the status of trouble tickets previously entered and tracked on the main frame system, and to format the main frame data trouble ticket into HTML data for transmission to the customer via http.

DETAILED DESCRIPTION OF THE PREFERRED EMBODIMENT

Figure 1:
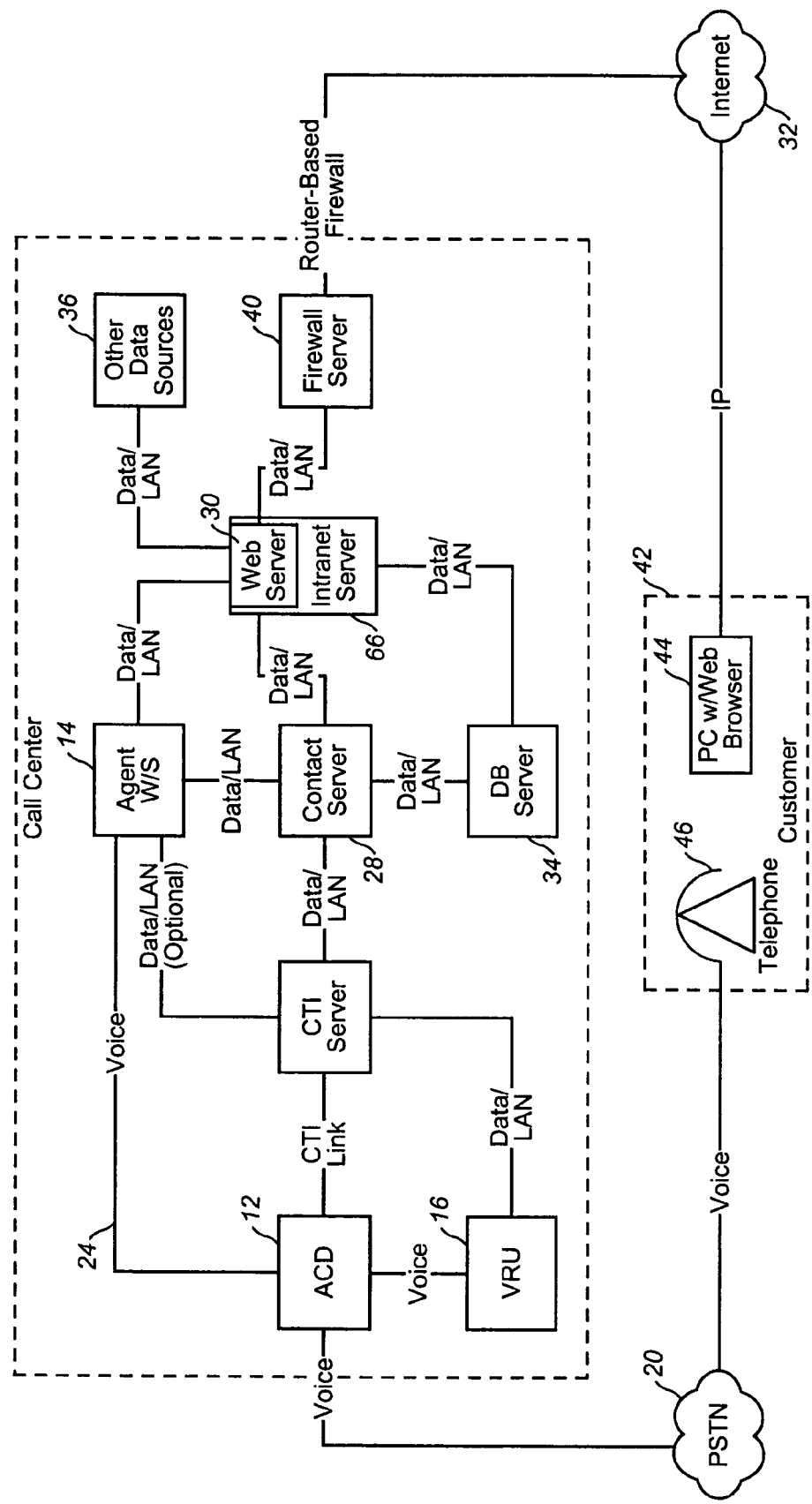
FIG. 1 is a diagrammatic illustration of the logical network architecture of a company call center which utilizes the present invention, which also illustrates the Contact Server of the present invention.

FIG. 1 is a diagrammatic illustration of the logical network architecture of a company call center which utilizes the present invention. The invention may include the standard components of a company call center such as an Automatic Call Distributor 12 (ACD), which provides a telephony switching means; a plurality of Agent Workstations, one of which is illustrated in FIG. 1 at 14. The agent work stations 14 normally include a Personal Computer (PC) running customized communications and browser software and an agent telephone station. The call center may also include one or more Voice Response Units (VRU), one of which is illustrated in FIG. 1 at 16; and a Computer/Telephony Interface (CTI) Server 18, which provides a data interface to the ACD for the other components of the invention.

The ACD 12 is linked to the Public Switched Telephone Network 20 (PSTN) via voice trunks 22. All incoming telephony calls to the call center arrive at the ACD 12. The ACD 12 has voice trunks 24 to each agent workstation 14 (specifically the telephone station) and to each VRU 16. Agent workstations 14 are operated by live operators to provide customer and operator services. The VRUs 16 run specialized interactive voice response applications for providing automated customer and operator services. The CTI port to the ACD is also linked via link 26 to the CTI Server 18. One representative example of a suitable telephony server 18 is the T-Server as manufactured by Genesys.

The CTI Server 18 provides event data from the ACD 12 to computers such as the agent workstations 14, VRUs 16, and the Contact Server 28.

In accordance with the present invention, Contact Server 28 is used to provide call-back services for customers separate from, in addition to and in conjunction with any call back services provided by the ACD 12 and VRUs 16. The Contact Server 28 may also receive call-back requests directly from customers over an IP network from web server 30, and it distributes requests to qualified agents at agent work stations 14. The contact server 28 may also reserve qualified agents for specific types of problems in order to fulfill the call-back request.

In the preferred embodiment, customers submit call-back requests via the Internet 32, an Intranet or other comparable IP network, and agents may fulfill those requests by placing outbound calls to the customers via the ACD 12 and PSTN 20. However, the Contact Server 28 is designed to manage call-back services in a manner that is independent of the communications networks used. As will hereinafter be described in greater detail, these call back services may include other methods of receiving and fulfilling call-back requests such as Internet voice telphony, Internet video, chat or e-mail communications.

The Contact Server 28 also facilitates communications with other data sources, such as a data base server 34, or other data resources, such as a company main frame, as generally illustrated at 36. These data sources include components such as database servers 34 that store and serve data specific to whatever applications and services are provided by the call center. For example, one implementation of the Contact Server and call-back service is to enhance a service that enables external customers of the company to view any trouble tickets over the Internet or IP network by accessing a trouble ticket database. Alternately, the Contact Server may access a company main frame system which provides problem identification services for customers. These types of resources are embodied on a data resource as represented in FIG. 1 by other data sources 36.

In one embodiment of the invention, a Web site may be provided for providing this service, which site is supported by an Intranet Server 66 as illustrated in FIG. 1. In this embodiment, the Intranet Server 66 interfaces directly with this database server 34 and other data sources 36, as shown in FIG. 1. The intra company interface is generally via data communications over a LAN or WAN network.

Figure 2:
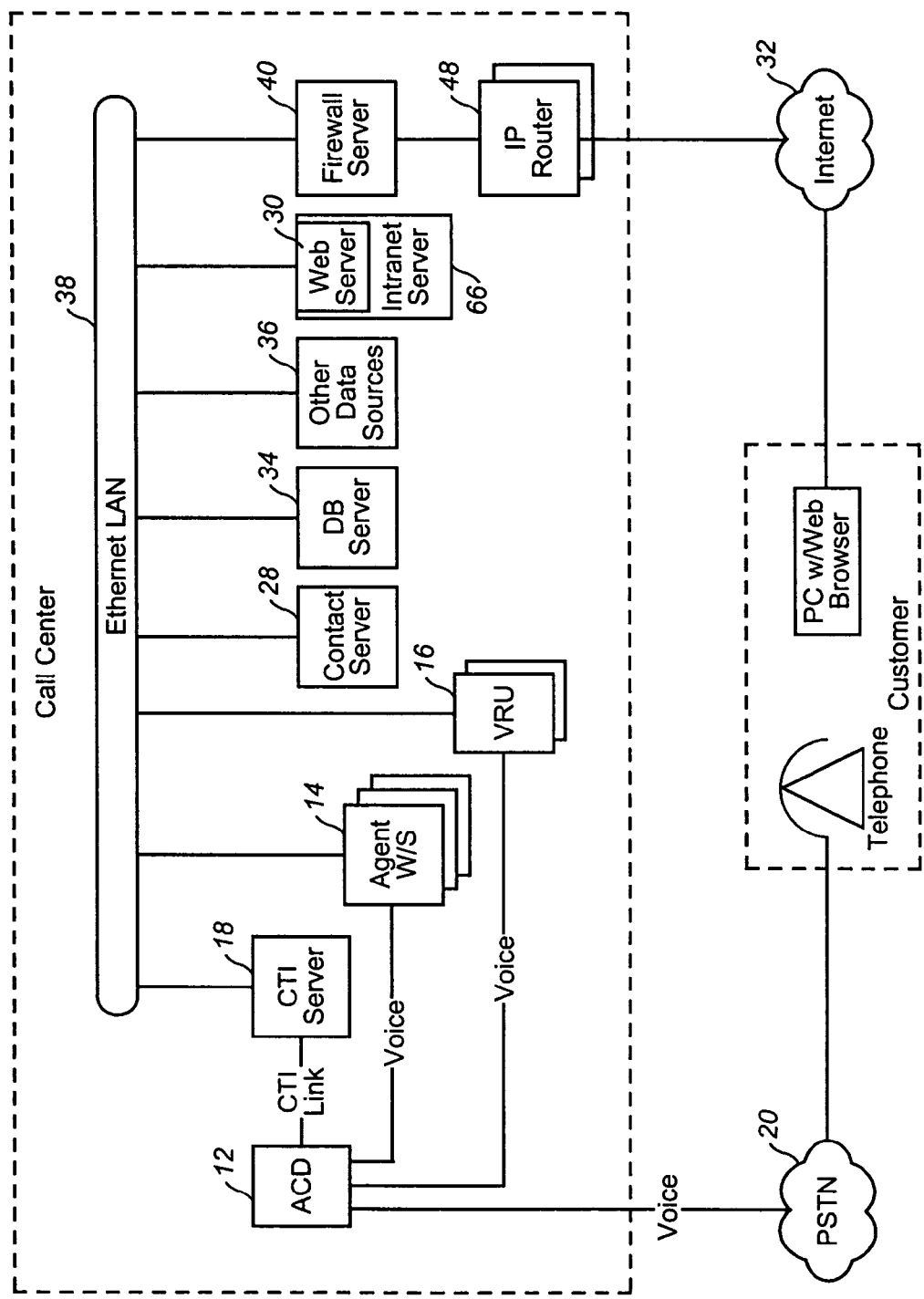
FIG. 2 is a diagrammatic illustration of a physical network architecture, illustrating one possible implementation of the logical architecture-of FIG. 1.

FIG. 2 illustrates one possible implementation of the logical architecture of FIG. 1 in a physical network architecture having an Ethernet LAN 38 which provides data connectivity among the various computer components of the call center described with respect to FIG. 1.

Each agent workstation 14 runs a Web browser, such as Microsoft Explorer® or Netscape Navigator® or Communicator® for IP communications, and customer service workflow software, such as Clarify®, for providing customer services.

The database server 34 represents and embodies all databases related to the call-back service. As will be hereinafter described in greater detail, these include a call-back request database in which call-back requests are stored and queued, agent state tables, and agent skills tables.

The intranet server 66 is a computer that embodies a Web Server 30. The Web Server 30 supports the Web site and TCP/IP communications for whatever services are being supported by the call center, such as the Web site that allows customers access to a trouble ticket database maintained on data base server 34.

A customer, generically illustrated at 42 in FIGS. 1 and 2, who desires to make use of the invention will normally have a Personal Computer (PC) 44 running customized communications and browser software and a telephone 46.

Java applets may be used in the practice of the invention to support the call-back service and the applets and other features are stored on and may be downloaded within the company LAN or WAN from the Web Server 30. A second server, referred to as a Firewall Server 40, provides secured access to the Intranet Server 66 from the Internet 32.

The Firewall Server 40 has an identical Web Server process running on it; it is from this Web Server (on the Firewall Server 40) that the Java applets are downloaded to the customer PC and web browser 42. Identical Java applets are downloaded to agent workstations 14 from the Web Server 30 that runs on the Intranet Server 66. The use of the Firewall Server 40 will hereinafter be described in greater detail with reference to FIG. 4.

As shown in FIG. 2, the Firewall Server 40 interfaces with the Web Server 30 via the Ethernet LAN 38 and accesses the Internet 32 via one or more IP Routers 48.

Standard mid-range computers, such as DEC Alpha 4100 or 8400 servers, can be used for the Contact Server 28, Database Server 34, Intranet Server 66, Firewall Server 40, and may also be used for the other data sources 36.

When the Contact Server 28 is first brought on-line, it registers itself as a client with the CTI Server 18, and requests to receive certain events. These events generally relate to agent 14 activities, such as logon, answer call, etc. The Contact Server 28 uses these events to maintain a state table, which is stored in the Database Server 34. The state table tracks the current state of each agent 14. The Contact Server 28 uses this to determine which agents are available to handle a call-back request. In the preferred embodiment, Microsoft's SQL Server is used for the state tables stored on the Database Server 34.

As a novel advantage of the Contact Server 28, it eliminates the need for an agent workstation 14 to interface with the CTI Server 18. In FIG. 1, the link between the agent workstation 14 and the CTI Server 18 is designated optional; this link is used in prior art call centers. But in accordance with the present invention, she agent workstation 14 has a link and API with the Contact Server 28 to perform the functions. The Contact Server 28 receives events from the agent workstation 14 and updates its state tables accordingly, thus tracking the state of each agent. Agents can place outbound calls from their workstations by submitting a command to do so to the Contact Server 28. This feature makes any communications networks used by the call center transparent to the agent workstation 14, which in turn simplifies both the programming of agent workstation software applications and agent responsibilities.

In the preferred embodiment of the Contact Server 28 and the call-back services it provides, a customer uses a PC equipped with a Web browser 44 to access a Web site that is supported by the Web Server 30 on the call center's Intranet Server 66. This Web site is secured and requires user authentication. Therefore, a customer must first be setup with a user profile. User profiles may be stored on the Database Server 34, and contain the customer's user i.d., password, and any other data as needed by the particular service. When the customer 42 has been authenticated, the Web Server 30 sends an HTML file that represents the site's home page to the customer's browser 44. Embedded in this file are the Java applets that manage the call-back services and TCP/IP sessions with agents 14. The Web Server 30 maintains a session with the customer's browser 44, using cookies or other session maintenance methodology.

While browsing the Web site, the customer 42 may encounter a need to speak with a call center agent. For example, if the Web site provides access to the trouble ticket database, a customer 42 may view a status of their trouble tickets and subsequently have a question. This is where the call-back service of the present invention is used. An option to place a call-back request is presented; this may be as a floating tool bar or an HTML button presented on each page of the Web site. When selected, the Java applet running on the customer's browser 44 presents a dialog box, which prompts the customer for call-back information. This generally includes the customer's name, call-back telephone number, and perhaps other information as needed. When the customer hits enter, the browser sends a message containing this information to the Intranet Server 66, via the Internet 32.

The Intranet Server 66 receives the call-back request. Since it has been maintaining a session with the customer's browser 44, it knows who the customer is from the customer log on. In the embodiment in which a secured Web site is used, the customer's user profile contains a customer identifier. This customer identifier designates the corporate business client that the customer represents.

An illustrative example of a client is an employee of a corporate business client who submits trouble tickets which are managed by Company's trouble ticket database. In the call center, agents are trained to service certain corporate customers. Skills designators are assigned to each agent to designate those corporate customers for whom the agents are trained. There may also be skill levels (such as high, medium, low) to designate the level of training an agent has received for a certain customer. Skills tables are stored in the Database Server that map skills designators and levels to agents.

Thus, when a call-back request is received from a customer 42, it must be sent to an agent who is trained to service the corporate business client represented by the customer. When the Intranet Server 66 receives the call-back request, it references the customer identifier from the customer's user profile. This customer identifier is added to the call-back request, as it will be used as a skills designator.

In other embodiments, other data may be used as skills designators. The Internet Protocol (IP) address of the customer browser 44 is also collected and added to the call-back request as a parameter.

The Intranet Server 66 passes the call-back request to the Contact Server 28. The call-back request generally include the information entered by the customer, along with the customer identifier, IP address, and the Universal Resource Locator (URL, the Web site address) of the Web page from which the call-back request was submitted. The Contact Server 28 queries a skills table on the Database Server 34 with the customer identifier (which is used in this example as a skills designator) to identify those agents qualified to handle the call-back request. In one embodiment, a software product by Genesys® is used for the skills tables, but other software can also be used.

The Contact Server 28 then queries the state tables on the Database Server 34 to identify an available agent with the highest skill level needed to handle the call-back request. If a qualified agent is available, the Contact Server 28 sends the call-back request to that agent. Otherwise, the call-back request is placed in a queue on the Database Server 34. The Contact Server 28 constantly monitors this queue and the state tables. If a qualified agent is available to handle a call-back request in queue, the Contact Server 28 sends the call-back request to that agent.

In alternate embodiments, a rules-based engine can be incorporated into the Contact Server 28 to process rules in determining how to manage the call-back queue and process call-back requests, as described in Alternate Embodiments and Features.

At the same time the Contact Server 28 sends a call-back request to an agent, the Contact Server 28 also sends a "not ready" message for that agent to the CTI Server 18. This will prohibit the ACD 12 from routing any inbound calls to the select agent, so that the select agent will be available to place an outbound call to the customer 42. Included in the call-back request that is sent to an agent workstation 14 are the information entered by the customer, the customer's IP address and the URL of the Web page from which the call-back request was submitted.

When the agent workstation 14 receives the call-back request, two processes occur. First, a window is displayed with the call-back information which generally includes a customer name and a telephone number. Second, a CGI script is downloaded from the Web Server on the Intranet Server 66 to the agent workstation 14, and executed on that agent workstation 14. The call-back request passes as parameters to the CGI script: the customer's IP address, the URL of the Web page from which the call back request was submitted, and perhaps other information as needed by a particular service application (trouble ticket #, etc.). The CGI script launches the agent's Web browser and dynamically builds the Web page with the Java applet from the Web Server 30. This presents the agent with the same Web page from where the customer's call-back request was issued. The customer's IP address (and perhaps other service-related data) are passed as parameters to the Java applet, which is the same applet that is running on the customer's browser 44. Execution of this Java applet on the agent's browser establishes a TCP/IP communications session between the agent's browser running on the agent workstation 14 and the customer's browser 44. This communications session uses both push and pull technology for passing data between the agent 14 and the customer 42. The agent can perform actions on their browser, such as drilling down in a menu hierarchy or typing text, and push these updates to the customer's browser 44; or the customer 44 can pull these updates from the Web Server when they select an update option.

At the same time this agent to client communications session over the internet 32 is established, the agent places an outbound call to the customer's call-back number. This can be accomplished in any of four different ways:

1. At the same time the Contact Server 28 sends the call-back request to the agent, it sends a message to the CTI Server 18 to have the ACD 12 place an outbound call to the customer's call-back number. The ACD 12 places this call from the agent's workstation 14 (specifically, the agent's telephony station).

2. As an optional feature, the Contact Server 28 can set a timer when it sends the call-back request to the agent workstation 14. This timer (i.e., 30 seconds) allows the agent to review the call-back request and Web page to become familiar with the customer's situation. At the expiration of the timer, the Contact Server 28 sends a message to the CTI Server 18 to have the ACD 12 place an outbound call to the customer's call-back number. As another feature of the agents workstation 14, the agent can postpone the outbound call at the expiration of the Contact Server's 28 timer or another configurable period of time; or the agent can simply pause the timer and have the call placed when the agent is ready.

3. The dialog box presented to the customer 42 when placing a call-back request can prompt the customer 42 for a call-back time. If the customer 42 does not enter a time, they are requesting a call-back as soon as possible. Otherwise, they enter a time, which is passed in the call-back request to the Contact Server 28. The Contact Server 28 places the call-back request in queue, and then processes it at the requested time.

4. The agent can manually trigger the outbound call from their workstation 14. Most agent workstations 14 are equipped with telephone control software, which is used to place outbound calls by sending a command to the CTI Server 18. In the preferred embodiment of the present invention, the agent can place an outbound call by sending a command to the Contact Server 28, using a Contact Server API built into the agent workstation 14. The Contact Server 28 in turn places the appropriate command with the CTI Server 18. This eliminates the need for an agent workstation 14 interface with the CTI Server 18. This also simplifies the programming of agent workstation 14 applications, since only one interface (with the Contact Server 28) is needed, regardless of the type and number of communications networks used, and regardless of the type of CTI Server 18 used. This also simplifies the agent responsibilities.

The outbound call is placed to the customer's call-back number from the ACD 12. When the customer 42 answers, the ACD 12 conferences in the agent. The agent and customer 42 can now proceed with a telephone conversation, which represents the fulfillment of the customer's call-back request. At the same time, the agent and customer 42 can engage in a TCP/IP communications session. During this session, the agent workstation 14 communicates directly with the Intranet Server 66; the Contact Server 28 does not play an active role, but monitors for when the session ends.

Establishment and maintenance of the TCP/IP session between the agent and customer is a novel feature. The Java applets that run on the agent's browser and the customer's browser 44 pass the events performed by the agent and customer to each other. This is very useful in conjunction with a telephone conversation. As the agent assists the customer 42 via verbal communication, the agent can display examples or point to items on the Web page. As the agent types in text or performs other visible actions on their browser, the agent hits an update option on their browser. The update action causes the Java applet that is running to send the updates (agent's actions) to the Web Server 30. These updates can either be pushed to the customer browser 44, or the customer can pull them from the Web Server 30. Updates are sent in a proprietary application protocol that uses TCP/IP messaging. The Java applet running on the customer browser reads these updates and performs them on the customer browser 44.

This technique also enables an on-line chat session to be conducted, which can replace or augment the telephone call.

More details on the call-back process are included in reference to FIG. 7.

Figure 3:
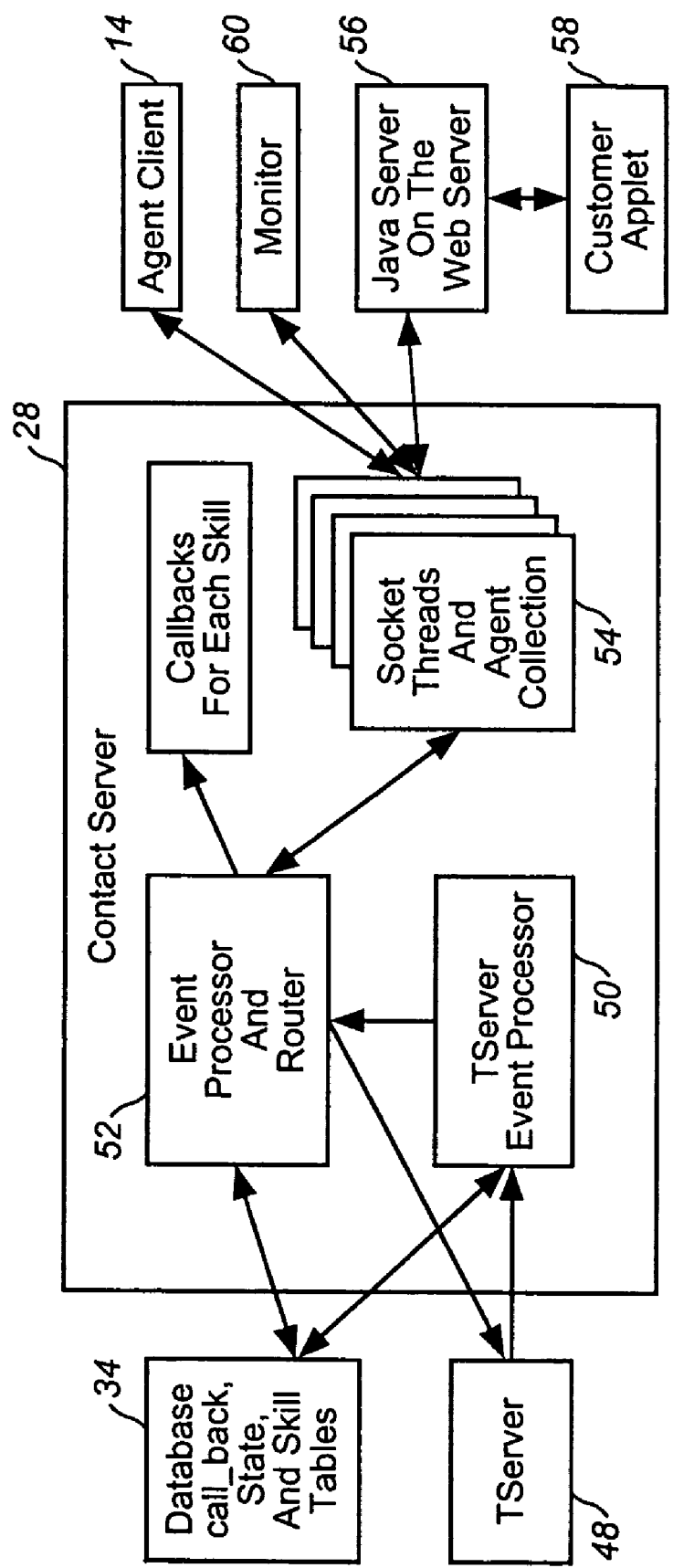
FIG. 3 is a diagrammatic illustration of the Contact Server of the present invention and the components of the call center network with which it interacts.

FIG. 3 is a context diagram illustrating the logical processes and interfaces of the Contact Server 28.

The Contact Server 28 registers for events from the CTI Server 18 of FIGS. 1 and 2; in this example, the T-Server 48 from Genesys. The Contact Server 28 has a T-Server Event Processor 50 that first performs this registration, then receives and processes registered events from the T-Server 48. The T-Server Event Processor 50 uses T-Server 48 events to update state tables on the Database Server 34.

The Contact Server's 28 main process, an Event Processor and Router 52, is responsible for sending messages to the T-Server 48 for placing outbound calls and reserving agents.

The Database Server 34 contains the call-back queues, state tables, and skills tables. The Event Processor and Router 52 is responsible for querying the skills and state tables generally located in the Database Server 34 to find qualified and available agents for call-back requests, and for querying the call-back queues to retrieve call-back requests for processing.

The Contact Server 28 has TCP/IP socket threads 54 that listen for events from the Java Server 58 on the Web Server 30. The Contact Server 28 specifically listens for call-back requests. The Intranet Server 66 shown in FIG. 1 is a computer upon which a Web Server 30 process runs. Within the Web Server 30, a Java Server 58 runs. The Java Server 58 serves the Java applets to the agent browser; an identical Java Server on the Firewall Server 40 serves Java applets 58 to the customer browser.

The Contact Server 28 also has threads 54 that listen for events from the agent workstations 14 ("Agent Client") and that receive data from the agent workstations 14, via a Contact Server API on each agent workstation 14. For example, an agent may log off to take a break, in which case the Contact Server 28 will receive this event and update its state tables generally located in database server 34 to indicate that agent is no longer available. The agents can set themselves as "ready" or "not ready", or "available" or "not available" by sending these state updates to the Contact Server 28. This eliminates the need for an agent workstation to make duplicate updates to each system they interface with, such as the CTI Server 18. The Contact Server 28 makes these updates in the state tables and tracks agent status. The Contact Server 28 is used in this manner, independent of whatever communications networks are being used by the call center.

A Monitor 60 can be linked to the Contact Server 28 for the purpose of displaying call-back messages, agent states, and owner information processed by the Contact Server 28.

Figure 4:
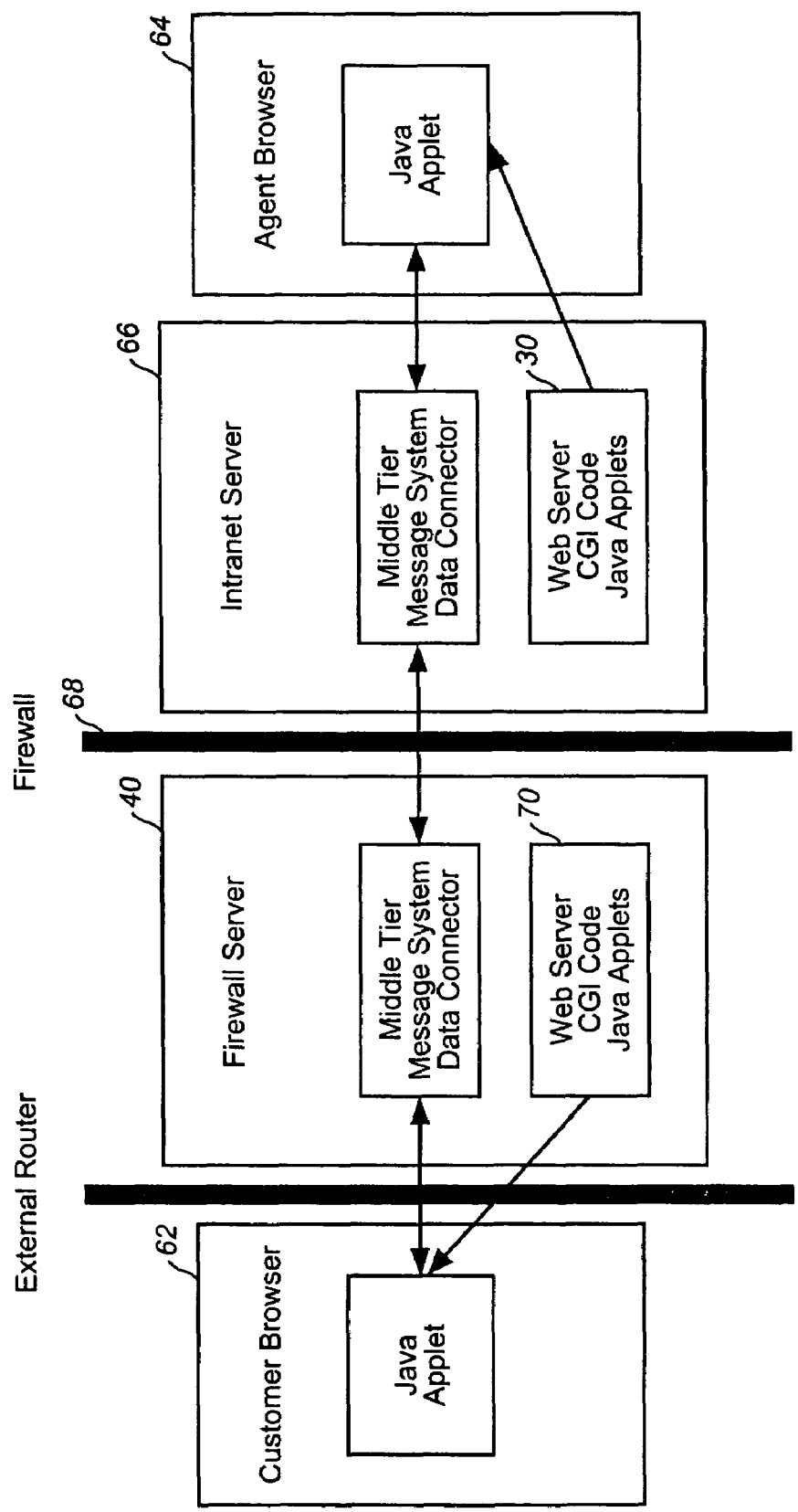
FIG. 4 is a diagrammatic illustration of an implementation of the present invention which provides security for the companies' data.

FIG. 4 illustrates the interfaces used for TCP/IP communications between the agent and the customer. The Agent browser 64 communicates directly with the Intranet Server 66, with the Contact Server 28 in FIGS. 1, 2, and 3, only monitoring for the termination of the session, so that it can update its state tables.

The Intranet Server 66 is used for a Web Server 30 to support the Web sites and TCP/IP communications for the services provided. Within this Web Server 30 are the Java applets that are downloaded to the agent browser. The Intranet Server 66 sits behind a router-based firewall 68 for security. However, the Java applets cannot maintain communications through this firewall. Therefore, a Firewall Server 40 contains an identical Web Server 70 with Java applets. It is from this Web Server 70 on the Firewall Server 40 that the Java applets are downloaded to the customer browser 62. Once the Java applets are downloaded and running on both the agent's 64 and customer's browsers 62, HTML files can be passed between the agent browser 64 and the customer browser 62.

Figure 5:
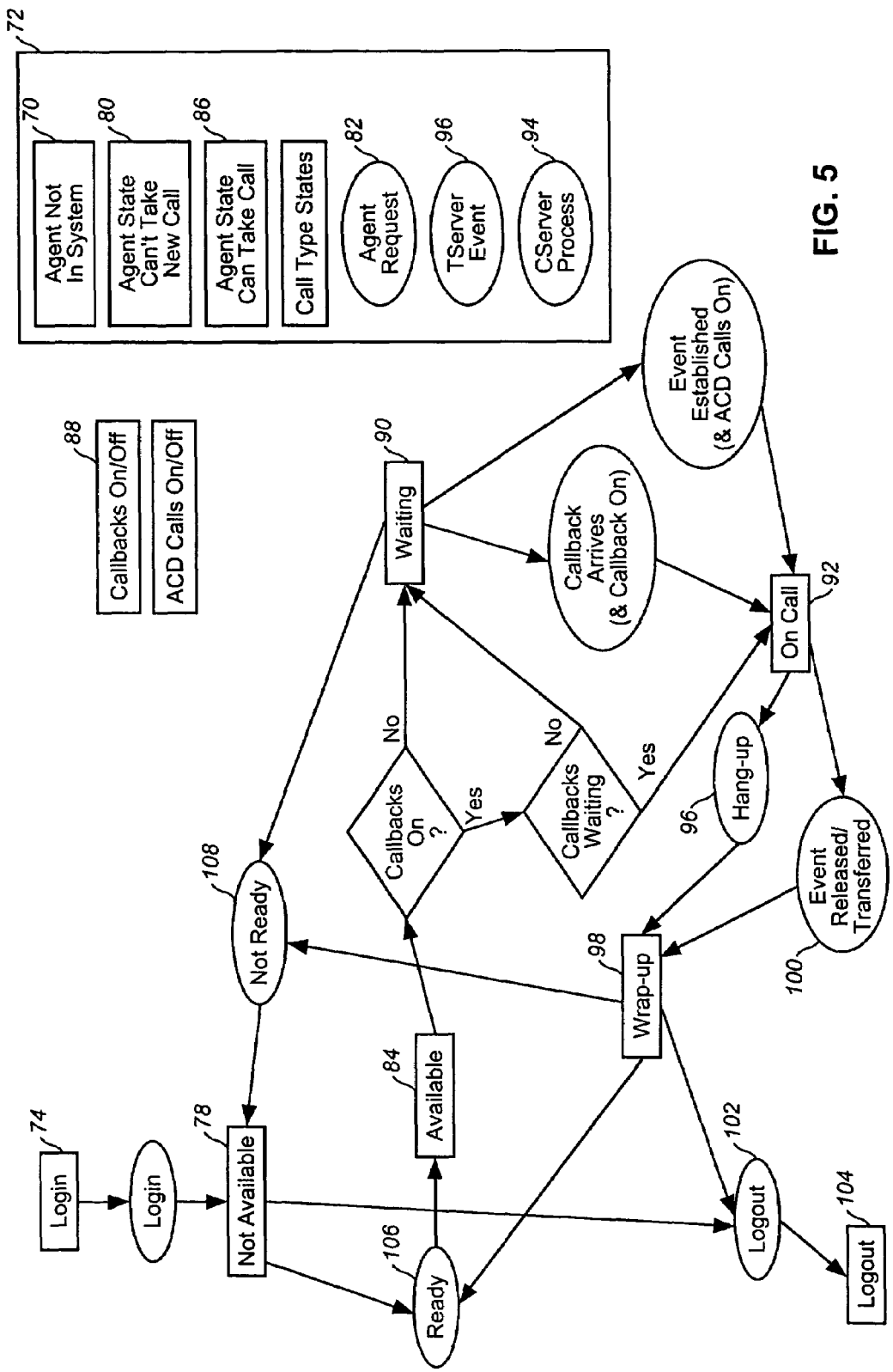
FIG. 5 is a logical state diagram of the agent availability logic used by the Contact Server of the present invention.

FIG. 5 is an event state diagram showing the illustrative example of states and state transitions maintained in the state tables 72 generally located in the Database Server 34 of FIG. 3. Normally, states represent those for agents. State transitions are performed by the Contact Server 28 and are triggered generally by events received from the CTI Server 18 and Agent Workstations 14. State transitions can also be triggered by the Contact Server 28, such as when it sends a call-back request to an agent.

Ovals represent actions (agent request, T-Server request, Contact Server request). Rectangles represent states.

When an agent is in a "login" state 74, they are not yet recorded in the system ("agent not-in system")76.

When an agent first logs in, they are placed in a "not-available" state 78. In reference to the key, this corresponds to "agent state can't take new call" 80. An agent must manually indicate (via an action taken at their workstation—"Agent Request" 82) that they are ready. This triggers a transition to an "available" state 84. In reference to the key, in this state, the "agent state can take call" 86.

The agent workstation has a toggle that can be set to callbacks "on" or "off" 88. If set to "off" ("Callbacks On"=no), the agent is placed in a "waiting" state 90. In reference to the key, in a "waiting" state 90, an "Agent State Can take Call" 86. If set to "on" ("Callbacks On"=yes), a test is performed to determine if any call-back requests are waiting in queue. If not, the agent is placed in a "waiting" state 90. If call-back requests are waiting, the agent is placed in an "on call" state 92. In reference to the key, in an "on call" state, an "Agent State Can't take new Call" 80.

If an agent is in a "waiting" state 90 and a call-back request arrives and the agent's call-back toggle is set to "on" 88, the agent is placed in an "on call" state 92. In reference to the key, "Callback Arrives" is a "Contact Server Process" 94. Likewise, if an agent is in a "waiting", state 90 and an event is established ("T-Server Event" 96) to indicate the agent has received a call, the agent is placed in an "on call" state 92.

In an "on call" state 92, an agent can hang up 96("Agent Request" 82), which places the agent in a "wrap up" state 98, or the Contact Server 28 receives a release or transfer event 100("T-Server Event" 96), which also places the agent in a "wrap up" state 98. In a "wrap up" state 98, three "Agent Requests" 82 can be made. A logout 102 places the agent in a "logout" state 104. A "ready" 106 request places the agent in an "available" state 84. A "not ready" 108 request places the agent in a "not available" state 78. An agent can also make a "not ready" 108 request from a "waiting" state 90.

Figure 6:
FIG. 6 is a representative illustration of a sample HTML web page which enables a call back request.

FIG. 6 is a representative illustration of a sample HTML web page 208. Typically, a web browser such as Microsoft Explorer® or Netscape Navigator® or Communicator® displays a HTML web page such as the one shown in FIG. 6 by downloading a HTML file from a Web Server specified in URL. Additional pages may be displayed on top of the HTML web page 208 by Java applets that are also downloaded from the Web Server and running on a client browser. Shown in FIG. 6 are two separate frames overlaid on the html web page 208: a "Trouble ticket" frame 210; and a "Contact Me" frame 158, which enables a call back request. Both of these frames are controlled by the Java applets downloaded from the Web Server.

"Trouble ticket" frame 210 is an example of what a customer may be viewing on their web page before a call back request is made. This frame 210 also illustrates an example of how a customer may request to be synchronized with an agent by pushing on the "Sync With Agent" button 212. Sync, Push, and Pull mechanism is explained in detail in reference to the FIGS. 9(*a*), (*b*), and (*c*).

"Contact Me" frame 158 is controlled by a Java applet running on the Client browser. This Java applet handles call back screen interface with the user and at the same time handles communications with the CallBack Server in the Web Server. The following paragraphs describe a detailed example of how a CallBack Java Applet may function in interfacing with the user and a Server.

Description of CallBack Java Applet Running on Client Browser:
1. Initialize all data parameters.
2. Get I/O connection from host (i.e., CallBack Server).
3. Get host parameters and port address for communication over socket.
4. Construct "Contact Me" screen and display it on Client's current screen.
5. Handle input events from the Client's screen; i.e., mouse input, keyboard input.
   5.1 If input event is a mouse click on a Name field, display message, "enter your name."
   5.2 If input event is a mouse click on a Phone Number field, display message, "enter your phone number".
   5.3 If input event is on a Contact-Method field and the Contact Method chosen is "Telephone", enable phone number and extension fields on the Client's screen; for all other Contact Method chosen, disable phone number and extension fields.
   5.4 If CallMeButton click event, then check if all the input parameters are entered.
   5.4.1 If input parameters are missing, display message. "Not enough information to complete call"; and return to step 5, and handle more input.
   5.4.1 If all the input parameters are entered, proceed to step 6.
6. Parse input parameters.
7. If Contact Method chosen is "Agent/Customer On Line Chat", include CGI script name in the URL path to be sent over a socket to CallBack Server; package input parameters into a buffer and write buffer over the socket connection to CallBack Server.
8. If Contact Method chosen is "E-Mail", include Customer's e-mail address in a send buffer; write buffer over the socket.
9. If Contact Method chosen is "Telephone", include Customer's telephone number in a send buffer; write over the socket.
   9.1 Wait for CallBack Server to send confirmation that call has been placed.
   9.1.1 If no confirmation arrives from the CallBack Server in a definite time-out period, display message, "There has been an error in receiving confirmation that your call has been placed", on Client's screen.
10. Listen over the socket for messages from the CallBack Server. (A new thread)
   10.1 If message received from the CallBack Server is "Contact Server Down", display message on the Client's screen, "Call me back function is not available."
   10.2 If message received from the CallBack Server is "Contact Server Up", display message, "To speak with an agent, please click on the Contact Me button. We will be happy to call you regarding your service inquiries."
   10.3 If message received is "Event", parse the message received and compare even types.
   10.3.1 If event type is "Insert Call Back", display message, "Thank you for using MCI Web Callback Service. Your call has been placed and an MCI Technical Specialist is contacting you now."
   10.3.2 If event type is "Delete Call Back", display message, "Your call has been canceled."
   10.4 Proceed to step 10.

Description of CallBack Server Running in Web Server:
One of the functions of this CallBack Server is to interact with the above CallBack applet.
1. Open connection with Contact Server.
2. If no connection, set a parameter "Contact Server Down", package message into a buffer and send to CallBack applet.
3. If connection exists, set a parameter "Contact Server Up", package message into a buffer and send to CallBack applet.
4. Open connection with CallBack applet. (A new thread)
5. Accept data from CallBack applet.
6. Parse message from CallBack applet.
   6.1.
   If Callback service was requested, call JContactClient class with event type set to "InsertCallBack".
   6.2. If cancellation of callback service was requested, call JContactClient class with event type set to "DeleteCallBack".

Figure 7A:
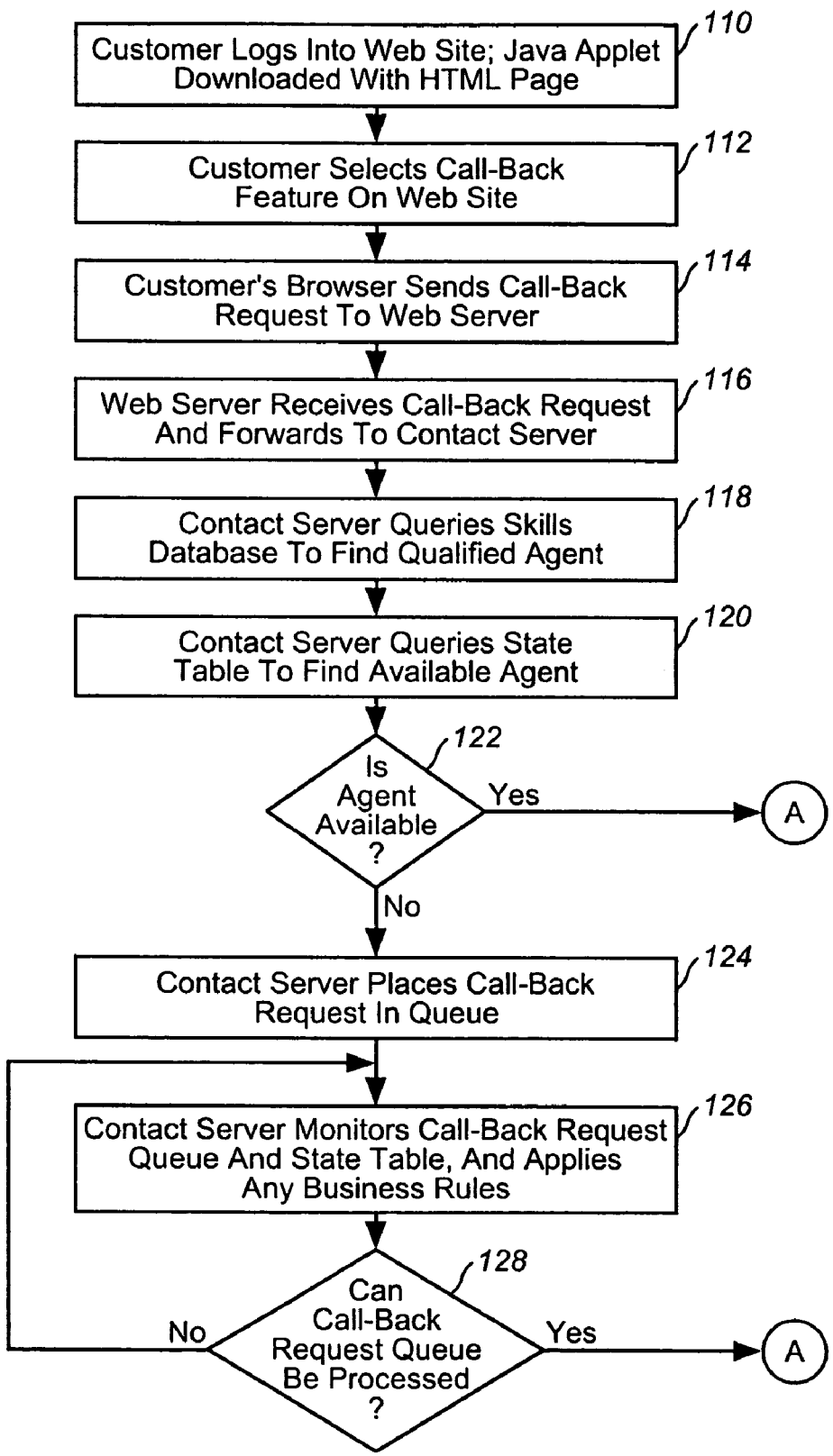
FIGS. 7a, 7b and 7c illustrate one possible logical implementation of the Contact Server within the company call center of FIG. 1.
Figure 7B:
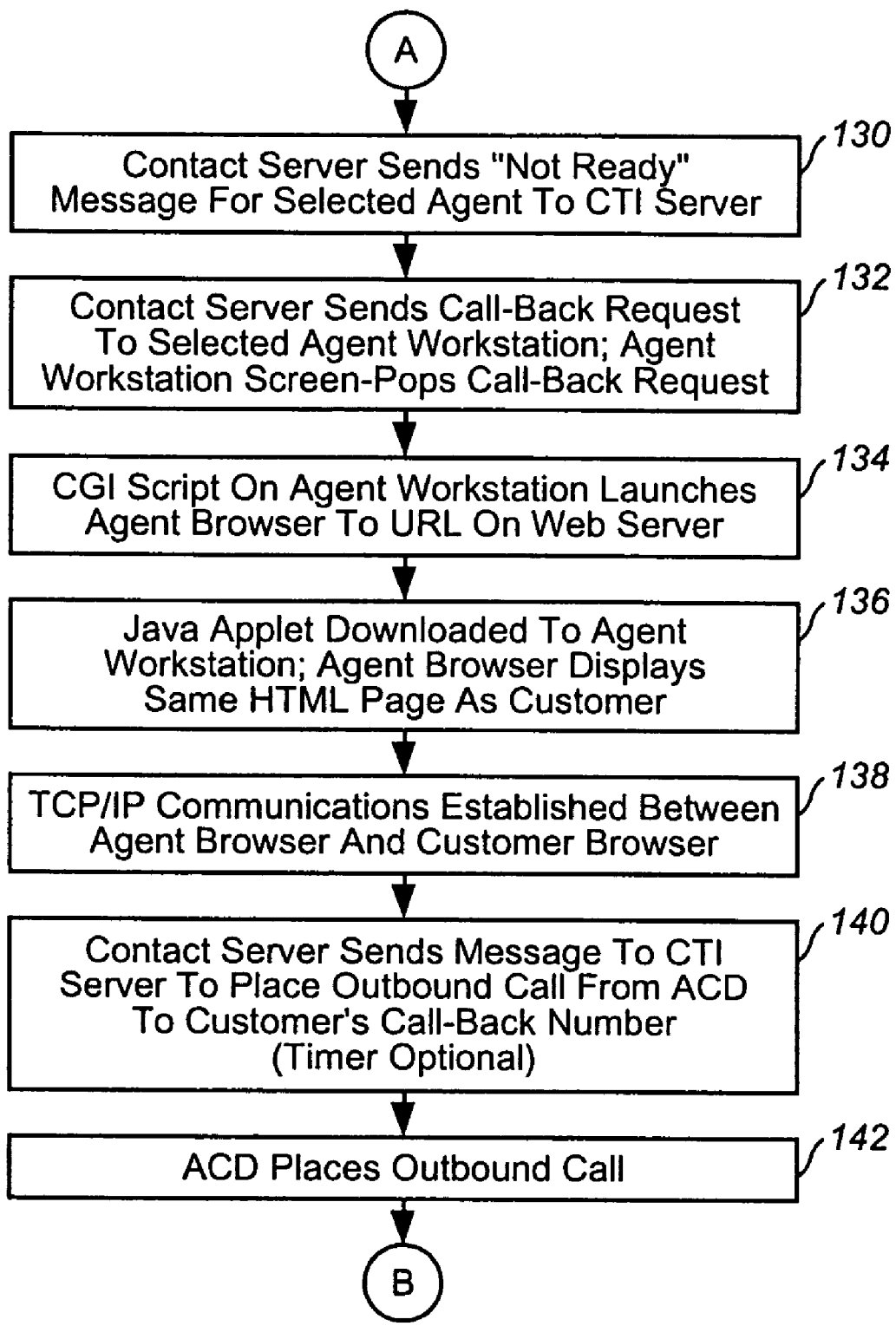
Figure 7C:
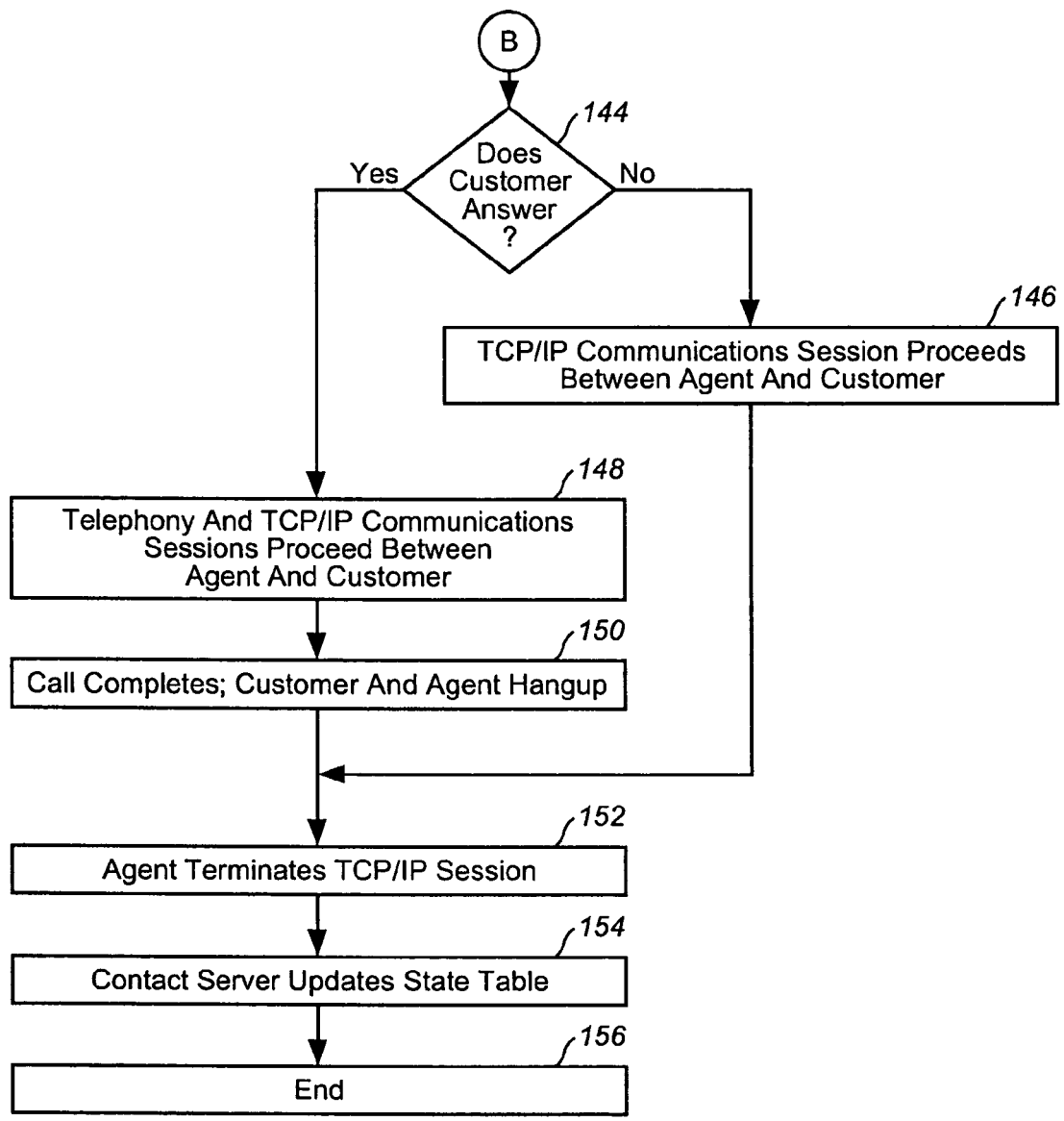

FIGS. 7a, 7b and 7c together comprise a flowchart illustrating the process of a call-back service using the Contact Server and the forgoing classes and functions. This shows a specific embodiment of the present invention, in which the call-back service is implemented for a secured Web site that requires user authentication. At the company, the Contact Server will be used with a Web site that allows the company's customers to access the company's trouble ticket system and view the status of their tickets. Therefore, each customer has a user profile setup in a profile database on the Database Server. It is from this database that skills designators are obtained.

A similar type of call-back service can be implemented with the Contact Server for other applications, not all of which require user login. Additionally, the Contact Server can be used to accept call-back requests from sources other than the Internet.

In step 110, a customer logs into a Web site. The Web Server authenticates the customer's user i.d. and password against the customer's user profile, which is stored in a database on the Database Server. If the customer is authenticated, the Web Server sends to the customer browser the HTML file that contains the Web site's home page. Embedded in this file are the Java applets that will be used to establish communications between the agent workstation and the customer PC. The Java applets perform other functions, such as present the dialog box for completing a call-back request in step 110.

The Web Server maintains a session with the customer browser over the Internet using cookies or other session maintenance technology. This way, when the customer submits a call-back request, the Web Server can identify that customer for the purpose of matching the call-back request to a qualified agent.

The customer can now browse the Web site. In the embodiment with the trouble ticket system, the customer can view the status of their trouble tickets. During this course, the customer may have a question or other reason to talk to a service rep (call center agent).

In step 112, the customer selects the call-back feature, which is typically an HTML button on a Web page. This causes a dialog box to be presented to the customer to prompt them for their name and call-back telephone number. The call-back telephone number can also include an extension, so that it the customer is calling from a PBX and an operator (live or automated) answers the phone on the call-back, the call center agent will know the extension needed to reach the customer.

Additional information can be solicited here as well, such as a customer identifier that can be used as a skills designator to match the call-back request to a qualified agent. A call-back time can be solicited, to state when the customer would like to be called back. Call-back time can be entered either as a specific clock time (i.e, 3:00 pm est), or as a duration (i.e., 20 minutes from now). Without a call-back time entered, it is assumed the customer is requesting a call-back as soon as possible.

In step 114, when the customer completes the call-back request dialog box and hits enter, the customer browser sends the call-back request to the call center Web Server, via the Internet.

In step 116, the Web Server receives the call-back request and forwards it to the Contact Server. In addition to the information provided by the customer in step 110, the Web Server includes in the call-back request message that it forwards to the Contact Server: the IP address of the customer, URL of Web page from which the call-back request was selected, and the customer identifier of the customer. The customer identifier is obtained from the customer's user profile when the customer logs on in step 110. In this embodiment, it is used as a skills designator. The customer's IP address and the URL will be provided to the agent workstation.

In step 118, the Contact Server queries the skills database with the skills designator (i.e., the customer identifier) to find a qualified agent; that is, an agent listed with that particular skills designator. The Contact Server actually identifies all agents with that skill, so that if one agent is not currently available, another agent can be used.

In step 120, the Contact Server queries the state table to find an available agent with the highest skill level of the needed skill.

In step 122, if a qualified agent is available, then the Contact Server proceeds to step 130.

If an agent is not available, then in step 124, the Contact Server places the call-back request in a call-back queue on the Database Server.

Step 126 represents a continuous process performed by the Contact Server. It monitors the call-back request queue and state tables, and determines if a qualified agent is available to take a call-back request in queue. In doing this, and as an additional feature, the Contact Server may apply business rules. For example, if a call queue on the ACD (which may be represented in the state table) is above a threshold, the Contact Server does not process call-back requests in queue, and will not until the call queue falls below a threshold. Or if the call-back request queue is above a certain threshold, the Contact Server may reject the next call-back request, sending the customer a message saying that the customer's call-back request cannot be processed at this time.

In step 128 the Contact Server determines if a call-back request in queue can be processed.

In step 130, the Contact Server sends a "not ready" message to the CTI Server for the agent selected in step 120. This will cause the ACD to not send any inbound calls to that agent, so that the agent will be available to place the outbound call to the customer.

In step 132, the Contact Server sends the call-back request to the select agent workstation. This request includes all information entered by the customer, as well as the customer's IP address and the URL of the Web page from which the call-back request was placed. The agent workstation, when it receives the call-back request, screen-pops the call-back request in a window displaying the customer's name, call-back number, and perhaps other information entered by the customer.

In step 134, a CGI (Common Gateway Interface) script is downloaded from the Web Server, and is executed on the agent workstation. It launches the agent's browser. The URL is passed as a parameter to the CGI script. The CGI script can then build the same Web page that the customer was at when they placed the call-back request. In reference to FIG. 4, the agent browser retrieves Web pages from a Web Server on the intranet Server 66, while the customer retrieves identical web pages from an identical Web Server on the Firewall Server.

In step 136, a Java applet is downloaded to the agent browser from the Web Server on the Intranet Server. The customer's IP address is passed as a parameter by the CGI script. The agent browser displays the same Web pace as the customer browser.

In step 138, the Java applet that was downloaded in step 136 establishes and maintains TCP/IP communications between the agent browser and the customer browser, using the customer's IP address that was included in the call-back request sent to the agent workstation.

In step 140, the Contact Server sends a message to the CTI Server to cause the ACD to place an outbound call to the customer's call-back number. As noted in reference to FIGS. 1 and 2, this can occur in any of a number of ways and at any of a number of points in the process. In the preferred embodiment, the Contact Server sends this message at the same time it sends the call-back request to the agent workstation, in step 132. Alternately, the Contact Server can set a timer in step 132. When the timer expires, step 140 is triggered.

In step 142 and in response to the message sent by the Contact Server in step 140, the ACD places an outbound call to the customer's call-back number. The call is placed from the agent's telephone station, so that the agent's telephone line to the ACD is seized during this process. The customer may or may not answer, as determined in step 144.

If the customer answers, then in step 148, both telephony and TCP/IP communications sessions proceed between the agent and the customer.

In step 150, the call completes and the customer and agent each hangup.

Referring back to step 144, if the customer does not answer, then in step 146, a TCP/IP communications session can still proceed between the customer and agent. In fact, an on-line chat session can replace a telephone call.

In step-152, the agent terminates the TCP/IP session.

In step 154, the Contact Server updates the state tables to show the agent is now available.

The following Agent Client API table lists the events, possible sources of each event, and actions taken by the Contact Server in updating the above state table and the state diagram of FIG. 5 in response to each event.

CContactEvent Class:

The CContactEvent class is a wrapper class that wraps socket and TServer data. The class includes of 25 protected member variables:

| Variable Name | Type | Description |
| --- | --- | --- |
| m_AgentID | CString | Unique identifier for a particular agent. |
| m_Ani | CString | Telephone number for the requested callback |
| m_CollectedDigits | CString | Caller entered digits on a VRU. |
| m_DefaultData | CString | Data attached to every call. |

-continued

| Variable Name | Type | Description |
|---|---|---|
| m_Dnis | CString | Dial number identification service. |
| m_ErrorMessage | CString | Description of error that has occurred. |
| m_OtherDN | CString | Destination number (DN) a call was transferred from |
| m_OtherQueue | CString | Queue a call was transferred from |
| m_TeleEvent | CString | Description of request/event correlating to TMessageType enum located in Ttypes.h. |
| m_ThisDN | CString | Current DN. |
| m_ThisQueue | CString | Current queue. |
| m_UserData | CString | Data specific to this event |
| m_IP | CString | URL related to soecific callback. |
| m_CallID | long | Switch's unique identifier for a call. |
| m_CallType | long | Refers to Web Phone, Telephone, See You See Me |
| m_ConnID | long | T-Server's unique identifier for a call. |
| m_ErrorCode | long | Numeric code for error that has occurred. |
| m_FileHandle | long | Voice mailbox file. |
| m_OtherTrunk | long | Trunk a call was transferred from. |
| m_UserRefNumber | long | Number of requests related to this event |
| m_ThisTrunk | long | Current trunk. |
| m_TimeInQueue | long | Amount of time a call/callback has waited in queue |
| m_Event | short | Numeric code correlating to TMessageType enum from Ttypes.h. |
| m_LastCollectedDigit | short | Last caller digit entered on VRU. |
| m_LoginType | short | Type of loqin used: DN, PCLogin, ACDLogin, Other |

CContactEvent Functions:

Constructors: The class includes two constructors. The first is a standard default constructor taking no parameters and performing no additional tasks. The second constructor takes one CString parameter which is pipe ("|") deliminated.

This constructor sets the member variables by calling the GetKeyValue( . . . ) function to parse out the data from the CString parameter passed to it.

void SetVariableName( . . . ): The CContactEvent class includes 25 functions to set, or assign, the value of each member variable, one function per variable. Each function takes one parameter of the same type as the member variable that it corresponds to, sets the variable, and has a returns void.

type GetVariableName( ): The CContactEvent class also includes 25 functions to get, or return, the value of each member variable, one functions corresponding to each variable. These functions do not take any parameters, and returns the value stored within the corresponding member variable.

CString GetSocketString( ):

This function returns a CString of "|" deliminated key-value pairs to send on a socket to a listener/server. The key-value pairs the function deliminates are the member variables of the CContactEvent class. The function will test each member variable to determine it is populated. If populated, it will add the variable key and its data to the CString it returns.

void ClearEvent( ):

This function will clear out any data that is stored in any of the object's member variables, with the exception of m_ThisDN. m_ThisDN is kept because the destination number will remain the same while the agent is connected to the server. The return value is void.

short DeleteUserData(long lParam, LPCTSTR dn, LPCTSTR szInKey):

This function takes three parameters, however, it does not use the first two (lParam & dn). The function is designed to delete a portion of the m_UserData variable, which must be a "," deliminated string. The szInKey parameter is the key of the data the function will delete, and the function will delete the data in the string that resides between the two commas following the key.

short DeleteAllUserData(long lparam, LPCTSTR dn):

The function does not use the two parameters passed. The function will set the m_UserData member variable to an empty string ("")

CContactClient Class:

The CContactClient class is an API designed to facilitate the communications between the Agent application and the CServer via TCP/IP sockets by establishing/terminating the server connection and sending/receiving data. Additionally, the CContactClient class functions as a wrapper for the CContactEvent class.

Variables:

Variable names followed by (.cpp) are declared within the .cpp file rather than the .h file. This is so the ReceiveThread function, a statically declared function, can use these variables.

| Variable Name | Type | Description |
|---|---|---|
| m_ServerName | CString | Stores the IP address of the server connected to. |
| pEventSocket | CContactSocket | Pointer to a CContactSocket object. |
| ConnectionStatus | SocketStatus | Enum type defined in the CContactSocket class. Refers to the status or the socket connection to the server. |
| CurrentEvent | CContactEvent | Inbound CContactEvent object from the socket. |
| TMessageString [86] | CString array | String representation of the TMessageType enum from Ttypes.h. |
| ErrMsg (3) | CString array | Error string message associated with the #define constants listed in the previous section. |
| pListenerSocket (.cpp) | CContactSocket | Pointer to CContactSocket object the receive thread uses. |
| EVENT_OBJECT (.cpp) | struct | Structure for a single linked list containing a CContactEvent object and a pointer to the next link. |
| pEventHead (.cpp) | EVENT_OBJECT | Pointer to the head of the linked list. |
| OutboundEvent (cpp) | CContactEvent | CContactEvent object to be sent to CServer. |
| m_hWindow (.cpp) | HWND | |
| m_lWindow (.cpp) | long | |
| m_Msg (.cpp) | UINT | |
| m_hListener | HANDLE | Handle for receive thread. |

Functions:

Constructor: The constructor initializes the pointers pEventHead, pEventSocket, and pListenerSocket to null; initializes the string messages for the ErrMsg array; and initializes the string descriptions for the TMessagestring array.

Destructor: Calls CContactEvent's member function ClearEvent( ) to clear data stored in CurrentEvent and OutboundEvent. Deletes all elements that may exist in the EVENT_OBJECT linked list, including pEventHead.

Closes the receive thread and sets pListenerSocket to null. Disconnects from CServer and sets pEventSocket to null.

short Open(LPCTSTR szServerName)

short Open(LPCTSTR szServerName, ClientType client):

This overloaded function takes one or two parameters. szServerName refers to the IP address of the server to connect to and client refers to the type of client logging in (i.e., monitor client, agent client, or web client).

The function checks pEventSocket for a null value. If null, it allocates and CContactSocket object with the new keyword. Next, the function checks ConnectionStatus for a connected state. If connected, it sets an error message advising a server connection already exists and returns a false, or 0, value. If no connection exists, the function sets the client type for the CContactSocket with client, or a default of AGENT_CLIENT if the function does not receive a client parameter; sets CContactClient's m_ServerName with szServerName; and calls CContactSocket's connect function to make a connection to the server.

If the connection fails, the function sets an error message with the error received from the CContactSocket object, deletes pEventSocket, and the function will exit With a false value.

If a successful connection occurs, a second thread is started for receiving events from CServer.

short CloseServer( ):

Calls CContactEvent's member function ClearEvent( ) to clear data stored in CurrentEvent and OutboundEvent. Deletes all elements that may exist in the EVENT_OBJECT linked list, including pEventHead. Closes the receive thread and sets pListenerSocket to null. Disconnects from CServer and sets pEventSocket to null.

short isEventReady( )

short NextEvent( ):

These two functions have the same functionality.

These functions will remove the first element in the EVENT_OBJECT linked list and shift the second link to the head. When called, if pEventHead is null, the function (s) clear any data that CurrentEvent has stored in its member variables and sets the return value to false, or 0.

If the first element in the list is the only element, the function removes the element and sets pEventHead to null. Otherwise, the function removes the first element and the second link becomes the first.

CString GetSocketString( ):

This function calls CContactEvent's GetSocketString function to format CurrentEvent's member variables into a single, pipe ("|") deliminated string. The function returns the formatted string.

void CreateEvent(CContactEvent NewEvent):

This function will add a received event to the end of the EVENT_OBJECT linked list. If an empty list exists, it adds NewEvent as the first link.

Otherwise, the function will add NewEvent to the end of the list.

BOOL StartThread(LPCTSTR ServerName, ClientType Client):

This function calls CreateThread (MFC) to start the receive thread.

static DWORD WINAPI ReceiveThread(LPVOID socket):

This is the second thread designed to receive incoming events from CServer. The thread loop will block on the socket until an event is received. When received, the function will pass the event to CreateEvent(CContactSocket NewEvent) for addition to the linked list. If the received event is EventRegisterMachine, the function sets OutboundEvent's m_ThisDN variable with the m_ThisDN variable of the CContactEvent object received. Additionally, the function will post a message to the window if one is received.

Wrapper functions for CContactEvent:

void SetVariableName(type): The following functions act as a wrapper for the CContactEvent class. Each function is operating on the OutboundEvent object to set its member variables prior to sending the object to CServer. They accomplished by calling the object's member function(s) that correspond to setting the desired member variable. Each function takes a single parameter of the same type as the CContactEvent member variable to set and has a return value of void.

type GetVariableName( ): Again, the following functions act as a wrapper for the CContactEvent class. Each function is operating on the CurrentEvent object to get the data stored in its member variables. This is accomplished by calling the object's member functions that correspond to retrieving the desired member variable. Each function takes no parameters and returns a value of the same type as the CContactEvent member variable to retrieve.

short CallbackOn(LPCTSTR dn, short logType):

this function requests CServer set the agent's ability to handle callbacks on. It sets the OutboundEvent's m_Event to EventCallbackOn, and sets m_ThisDN and m_LoginType with the parameters passed.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the outboundEvent to the CServer over the socket and return a true, or 1, value. Prior to exiting, the function calls CContactEvent's ClearEvent function to clear data stored in the OutboundEvent's member variables.

short AgentLogout(long lparam, LPCTSTR dn):

This function requests CServer log the agent out. It sets OutboundEvent's m_Event with RequestAgentLogout and m_ThisDN with dn.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short MakeCall(long lparam, LPCTSTR dn, LPCTSTR szPhoneNumber):

This function requests CServer place a call. It sets OutboundEvent's m_Event with RequestMakeCall, m_Ani with szPhoneNumber, and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short CallAnswer(long lparam, LPCTSTR dn):

This function requests CServer answer a call. It sets OutboundEvent's m_Event with RequestAnswerCall and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentReady(long lparam, LPCTSTR dn):

This function requests CServer set an agent's status to ready. The function sets OutboundEvent's m_Event to RequestAgentReady and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentNotReady(long lparam, LPCTSTR dn):

This function requests CServer set an agent's status to not ready. The function sets OutboundEvent's m_Event to RequestAgentNotReady and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentBusy(long lparam, LPCTSTR dn):

This function requests CServer set an agent's status to busy. The function sets OutboundEvent's m_Event to RequestAgentBusy and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentNotBusy(long lparam, LPCTSTR dn):

This function requests CServer set an agent's status to not busy. The function sets OutboundEvent's m_Event to RequestAgentNotBusy and m_ThisDN with dn. The function does not use lparam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short DeleteCallback (CString ANI, CString IP):

This function requests CServer delete a callback. It sets OutboundEvent's m_Event to RequestDeleteCallback, m_Ani with ANI, and m_IP with IP.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short UpdateCallback(cstring appl_data, CString origination, CString method,
    CString IP, CString ANI, CString
    NaspID, CString ContactTime,
    int ContactResult):

This function requests CServer update an existing callback. It sets OutboundEvent's m_Event to RequestUpdateCallback, m_IP with IP, and m_Ani with ANI. The remaining parameters are formatted into a "Λ" deliminated string and set to OutboundEvent's m_UserData variable.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

Figure 8:
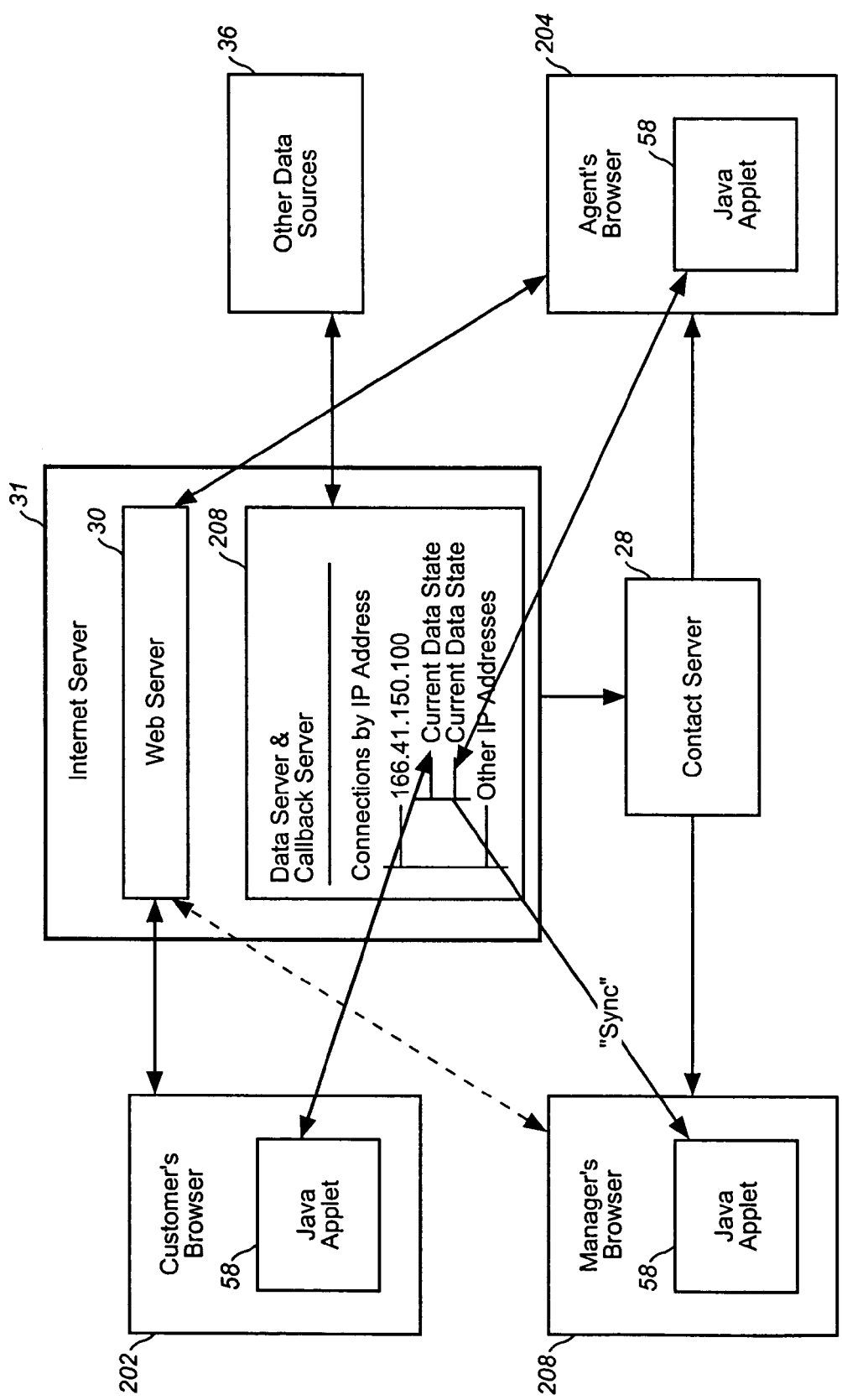
FIG. 8 is a diagrammatic illustration of one possible implementation of the push/pull synchronization of the agent and customer web browsers.

FIG. 8 is a diagrammatic illustration of one possible implementation of the push/pull synchronization of the agent and customer web browsers. When a customer logs into a Web site, the Web Server 30 sends to the customer browser 202 the HTML file that contains the Web site's home page. Embedded in this file are the Java applets 58 that will be used to establish communications between the agent workstation 14 in FIG. 1 and the customer PC 42 in FIG. 1. During this communications session, agent and client may view each other's actions and Data States on his/her Web pages through the Sync, Push, Pull mechanism.

Also shown in FIG. 8 is an illustration of how additional stations may listen in on conversation between a client and an agent over the internet using the same Sync, Push, Pull mechanism. For example, a manager station 208 may want to monitor various informations and activities that are being transferred between a client and an agent. This can be accomplished when a Manager's Java Applet 58 registers with the Data Server 206 and requests to be in a "Sync" mode in the same manner as the Sync, Push, Pull mechanism explained in detail below.

Figure 9A:
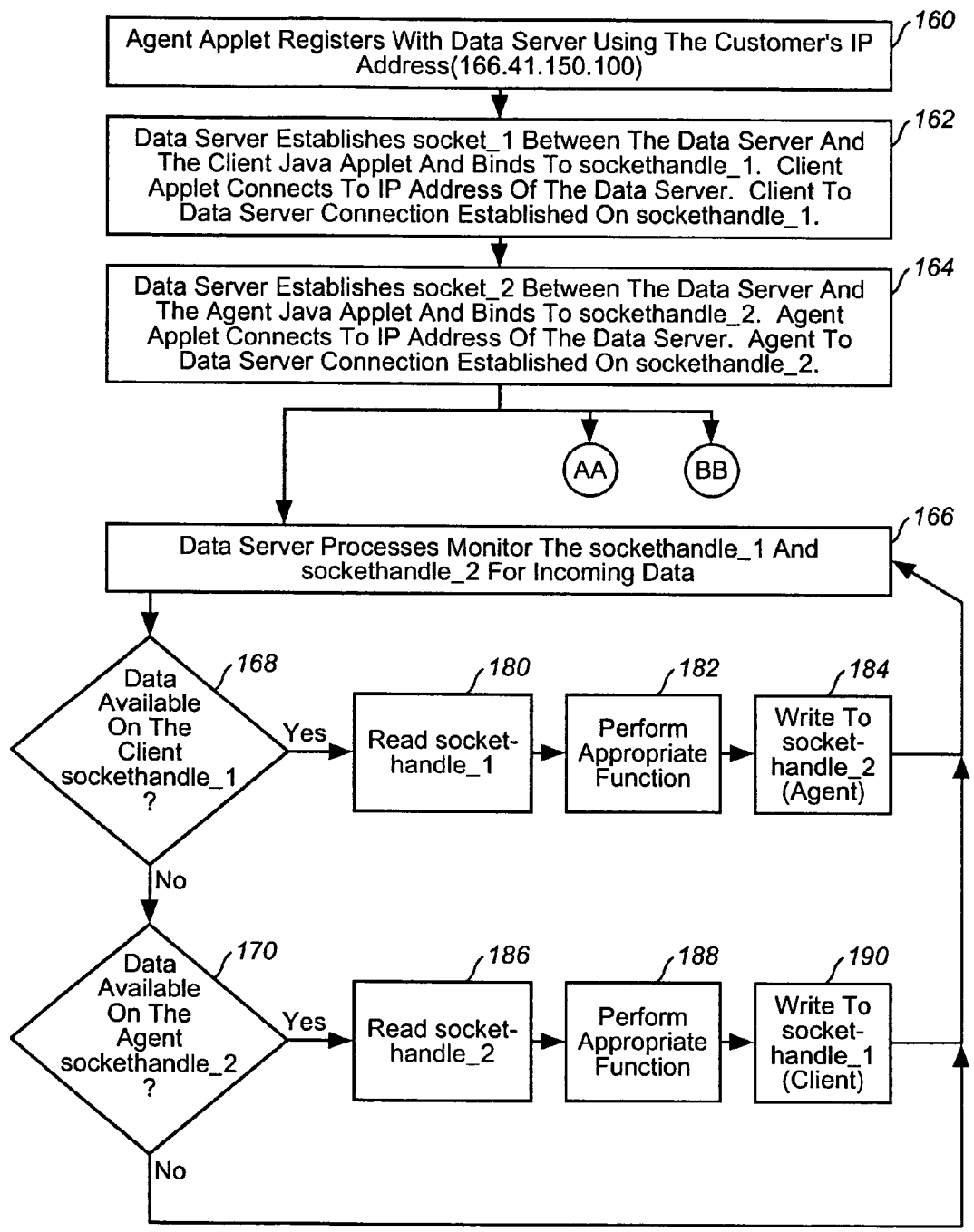
FIGS. 9(a)(b) and (c) illustrates one possible logical implementation of the push/pull synchronization of the agent and customer web browsers.

FIGS. 9(a)(b) and (c) illustrate one possible logical implementation of the push/pull synchronization of the agents web browser 204 of FIG. 8 and customer web browser 204 of FIG. 8. In step 160 of FIG. 9, the Agent Applet 58 of FIG. 8 registers with Data Server 190 using the Customer's IP address. This enables the Data Server 206 of FIG. 8 to link the particular Customer with that Agent.

In step 162 of FIG. 9, the Data Server 206 illustrated in FIG. 8 establishes a link between the Client Java Applet 58 and the Data Server 206 utilizing a system implemented TCP/IP socket communications mechanism. Data Server 206 creates a socket, binds to the network address and listens in for a connection from the Client Java Applet 58. The Client Java Applet 58 then creates a socket and connects to the Data Server 206.

Figure 9B:
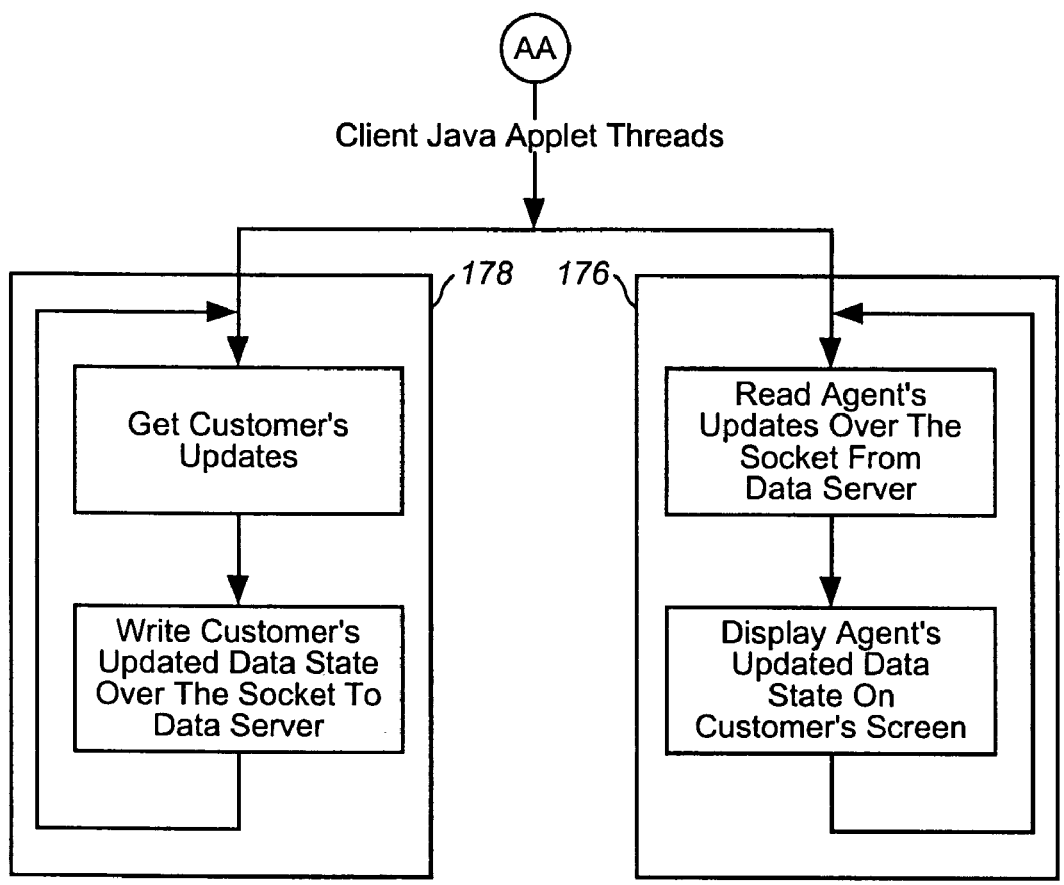

As illustrated in FIG. 9(b), the Applet 58 illustrated in FIG. 8 then performs the following functions: at step 166, one thread listens in over the socket ready to receive data from the Data Server 206, while another thread 178 waits for Customer screen updates, ready to transfer the updated Data State over the socket to Data Server 206.

In step 164, of FIG. 9(a), the Data Server 206 illustrated in FIG. 8 establishes a link between the Agent Java Applet 58 and the Data Server 206, utilizing a system implemented TCP/IP socket communications mechanism. The Data Server 206 of FIG. 8 listens in on the socket it created for a connection from the Agent Java Applet 58. A connection is established when the Agent Java Applet 58 of FIG. 8 creates a socket (e.g., by a call to socket ( )) and connects (e.g., connect( ) call) to the Data Server 206.

Figure 9C:
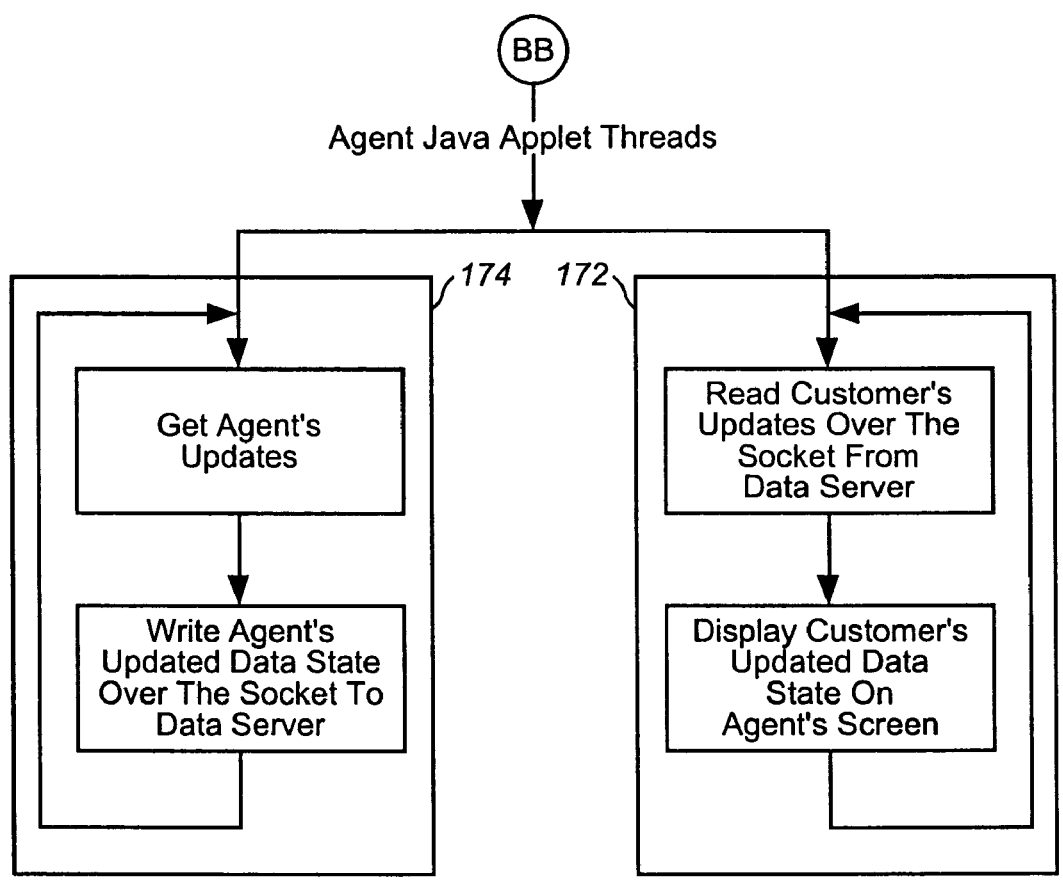

As illustrated in FIG. 9(c) the Applet 58 of FIG. 8 then performs the following functions: (a) one thread listens in over the socket ready to receive data from the Data Server 206 as illustrated in step 172; (b) while another thread, at step 174 waits for Agent screen updates, ready to transfer the updated Agent Data State over the socket to Data Server 206.

In step 166, of FIG. 9(a), the Data Server 206 illustrated in FIG. 8 monitors the Client 58 to Data Server 206 socket link, and the Agent 58 to Data Server 206 socket: link, for incoming messages from the Client Java Applet 58 and the Agent Java Applet 58.

As illustrated in step 168 of FIG. 9(a), when a message is received from the Client Java Applet 58 of FIG. 8, the Data Server 206 reads the socket handle at step 180 and performs the appropriate function at step 182, and relays at step 184, the message to the Agent Java Applet 58 by writing on the socket link established between the Agent Java Applet 58 and the Data Server 206 illustrated in FIG. 8.

A message from the Client Java Applet 58, for example, could be that Customer has changed screens. In a Sync mode, the Data Server 206 would read this data over the socket from the Client Java Applet 58, interpret the data and perform additional bookkeeping functions if any, and write this changed screen data over another socket to the Agent Java Applet 58. The Agent Java Applet 58 reads this data and displays it on the Agent's Web page. As a result of this action Customer and Agent view the same screen data on their Web pages.

At step 170 of FIG. 9(a), when a message is received from the Agent Java Applet 58, the Data Server 206 reads at step 186, and performs at step 188, the appropriate function, and relays at step 190 the message to the Client Java Applet 58 of FIG. 8 by writing on the socket link established between the Client Java Applet 58 in FIG. 8 and the Data Server 206 of FIG. 8. A message from the Agent Java Applet 58, for example, could be a request to send the agent's Data State to the Customer (i.e., a Push example). The Data Server 206 reads and interprets this message and writes the Data State on the socket connected to the Client Java Applet 58 which has the same IP address as the one with which the Agent Java Applet 58 has registered. The Client Java Applet 58 then reads the data and displays it on the Customer's Web page, resulting in the Push action.

The Sync, Push, Pull of the web pages include Java applet states, thereby making it compatible to work with ActiveX controls and other applications.

The above description is embodiment of the present invention; that is, accepting call-back requests over the Internet and fulfilling those requests with both a telephone call placed from a call center ACD and a TCP/IP communications session over the Internet. A novel feature of the Contact Server is that it can be used with virtually any communications technology. It essentially manages agent contacts with customers and places call-back requests. Several additional embodiments and features can be realized, some of which are noted below.

The Contact Server can be used in several different embodiments of call centers, using different communications technologies such as PSTN telephony, Internet data communications, or Internet telephony.

Figure 10:
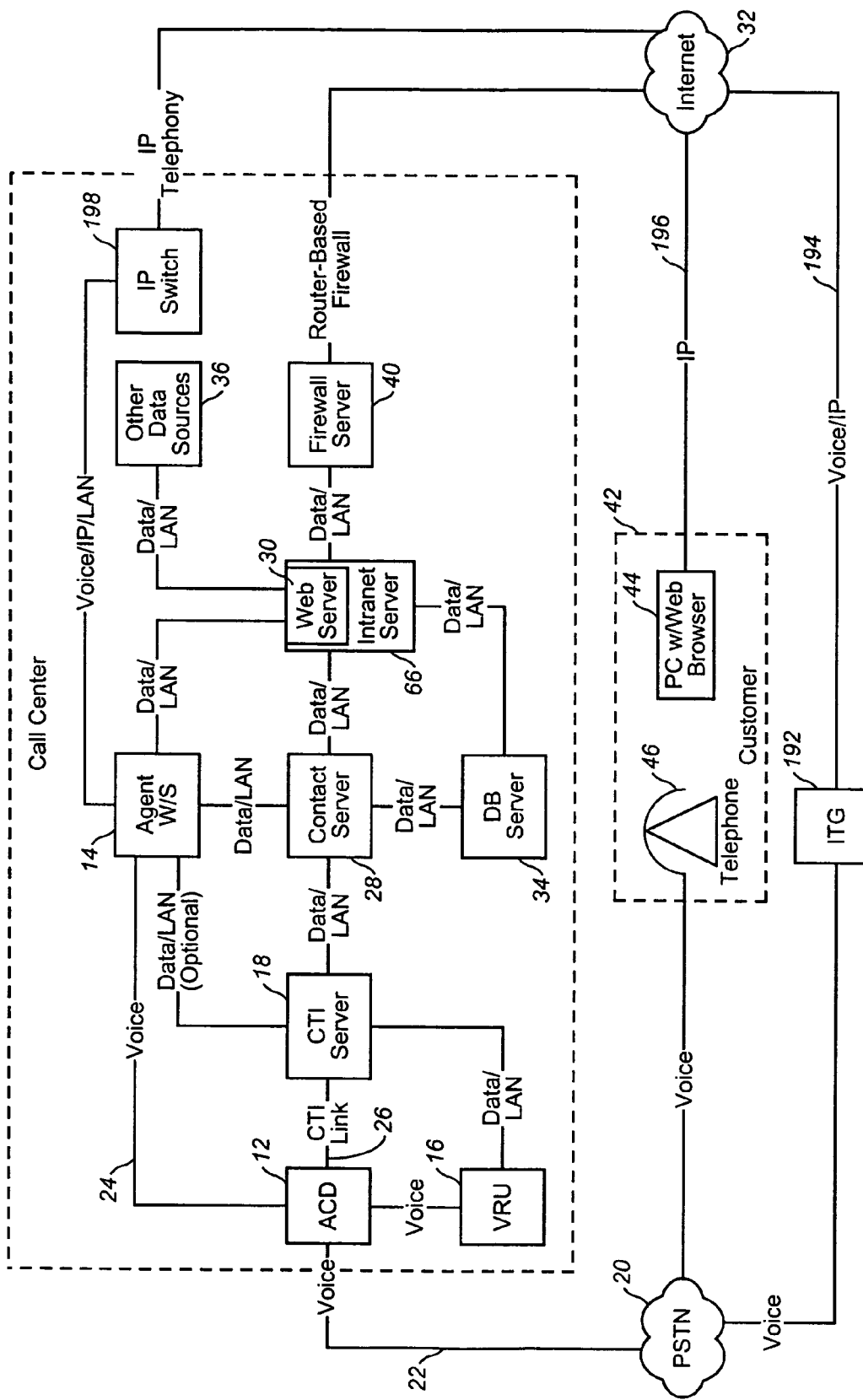
FIG. 10 is a diagrammatic illustration of the logical network architecture of a company call center of FIG. 1 which utilizes alternate IP telephony protocols for communication between the agent and the customer.

FIG. 10 is a diagrammatic illustration of the logical network architecture of a company call center of FIG. 1 which utilizes alternate IP telephony protocols for communication between the agent and the customer. An Internet/Telephony Gateway (ITG) 192 is used to provide telephone call services over the Internet 32. A call center agent can place a standard outbound call via the ACD 12 to the PSTN 20, but have the call routed to the ITG 192, which terminates the call as a voice-over-IP 194 call over the Internet 32 to an IP address 196. Likewise, a call can be placed from an IP address 196, access the ITG 192 via the Internet 32, and terminate to a call center agent via the PSTN 20.

Also shown is a direct link to the Internet 32 for agent workstations 14, using an IP switch 198. Agent workstations 14 in this embodiment are normally PCS equipped with Internet telephony capabilities, which are becoming common. This also enables video telephony, so that a video conference between the agent and customer can be setup using the call-back services provided by the Contact Server 28.

Call-back requests can also be placed over the PSTN 20. When a customer calls in to the call center and the call is routed by the ACD 12 to a VRU 16. This is standard practice. The VRU 16 can then collect caller information regarding the type of services required. The VRU 16 then queries the Contact Server 28 to determine if an agent is available or if the queue is above a certain threshold. If so, the VRU 16 can prompt the caller to place a call-back request. A similar method is described in another disclosure (COS-97-002); however, the present invention allows the call-back request to be submitted to the Contact Server 28, which can place a call-back using any available communications technology.

For examples, the Contact Server 28 can:

receive a callback request via the Internet 32, and place an outbound call to the customer 42 over the PSTN 20;

receive a callback request via the Internet 32, and place an outbound call to the customer 42 over the Internet 32;

receive a callback request via the PSTN 20/ACD 12/VRU 16, and place an outbound call to the customer 42 over the PSTN 20;

receive a callback request via the PSTN 20/ACD 12/VRU 16, and place an outbound call to the customer 42 over the Internet 32;

receive a callback request via the Internet 32 or PSTN 20/ACD 12/VRU 16, and place a video call to the customer 42 over the Internet 32;

receive a callback request via the Internet 32, and establish a TCP/IP session with the customer 42 over the Internet 32 and use on-line chat facility.

The Contact Server 28 can even receive a manual feed of callback requests. For example, a marketing representative may feed a list of numbers for sales leads to the Contact Server 28, which submits call-back requests to agents for these numbers.

Other features include:

If an available agent is not found within a certain time (90 seconds), the Contact Server 28 rejects the call-back request and sends a message to the customer 42 saying that the call-back request cannot be processed at this time.

Agents may need to access various systems to service a customer 42. For example, agents may need to access a mainframe customer information system. If this system is down, the agent cannot service a customer 42, and it would be a waste of resources to place a call to that customer 42. Therefore, the Contact Server 28 can have an interface to a process that monitors this system. If this system is down, the Contact Server 28 rejects the call-back request and sends a message to the customer 42 saying that the call-back request cannot be processed at this time. This can also be used with call-back requests received by the VRU 16 for PSTN 20 calls. The VRU 16 can determine what system is needed to service a customer 42, then query with that system's process monitor, and determine if the system is available. If the system is not available, the VRU 16 prompts the customer 42 to submit a call-back request. The call-back request is sent to the Contact Server 28. When the Contact Server 28 detects that the system is again available, the Contact Server 28 issues a command to the CTI Server 18 to have the VRU 16 place an outbound call to the customer 42.

If a queue time is above a threshold when a PSTN 20 call arrives at the ACD 12, the call is routed to a VRU 16. The caller is prompted to place a call-back request, which is then submitted to the Contact Server 28. Instead of a telephone number, the caller can enter an IP address, and have a call-back placed via the Internet 32.

A rules-based engine can be included in the Contact Server 28 to determine the action to take on a call-back request, based on criteria such as ACD 12 call queue, call-back request queue, etc. For example, if a call-back request queue is above a threshold, the Contact Server 28 can reject a call-back request and send a message to customer 42 stating that their request can not be processed at this time.

The Contact Server 28 can monitor the ACD 12 call queue. When this queue is above a threshold, the Contact Server 28 will not process call-back requests in a call-back request queue. When the ACD 12 call queue falls below a threshold, the Contact Server 28 begins processing call-back requests in the call-back request queue.

The Contact Server 28 can be equipped with a call-back cutoff button, as part of a user interface. This allows all call-back request processing to be manually shutoff, for example, if the call center is being overloaded with inbound calls.

The Contact Server 28 can use skills designators other than customer identifiers. This is useful to implement call-back services on Web pages that do not require user authentication and therefore do not have user profiles. The URL of the Web page (from which a call-back request is placed) can be matched to a skills designator to identify the agents trained to service that Web page. The IP address of the customer placing the call-back request can also be matched to a skills designator, assuming that IP address was previously registered with the Contact Server 28. Finally, information entered by the customer in the call-back dialog box can be used as a skills designator.

Figure 11:
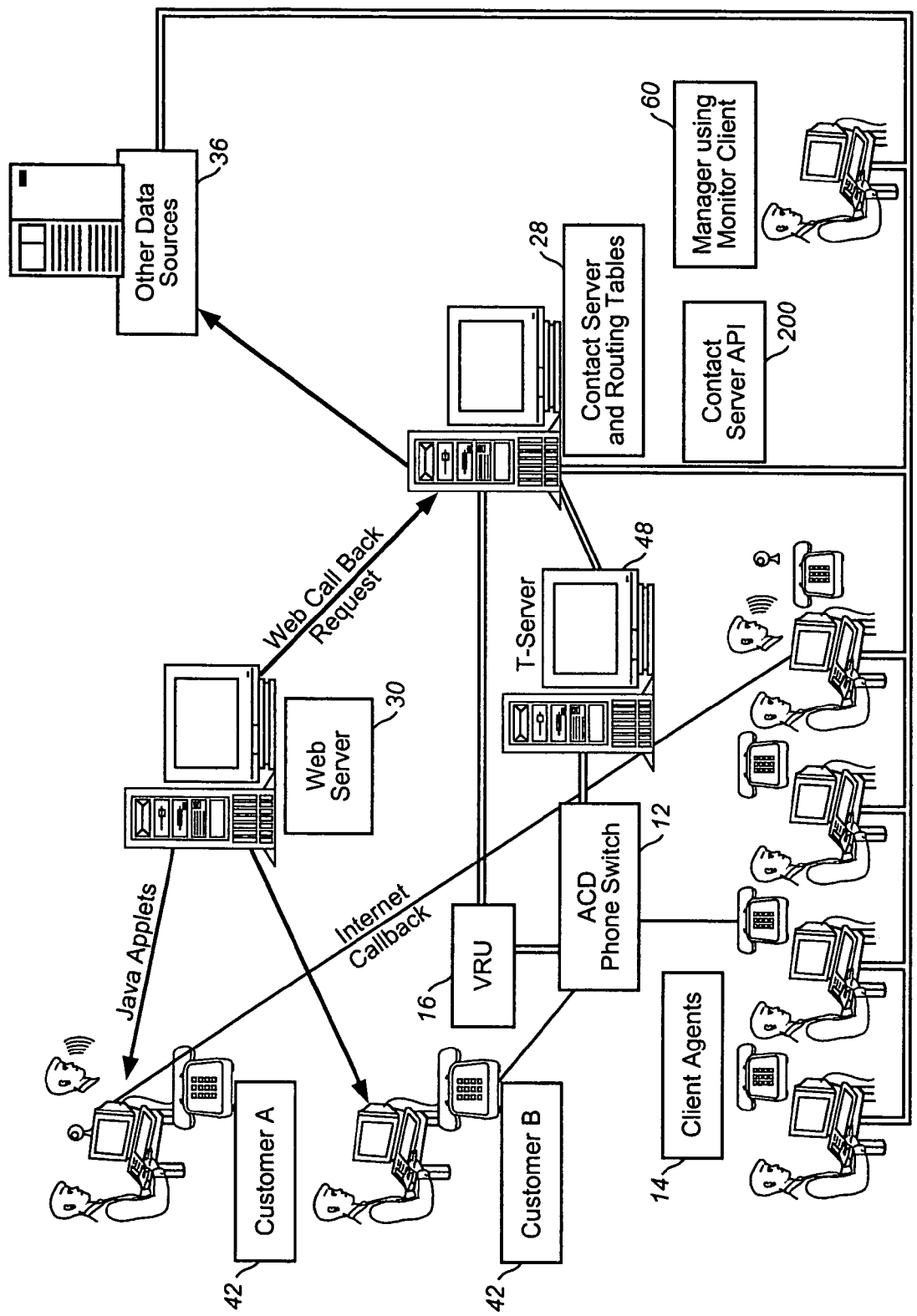
FIG. 11 is a figurative illustration of the network architecture of a company call center according to FIG. 1 which utilizes multiple alternate TCP/IP Protocols for communication between the agent and the customer.

FIG. 11 is a figurative illustration of the network architecture of a company call center according to FIG. 1 which utilizes multiple alternate TCP/IP protocols for communication between the agent and the customer. This Figure illustrates how alternate methods of call-back may be used by customers and agents. While one agent 14 communicates with Customer B 42 by the ACD phone switch 12, another agent 14 communicates with Customer A by both the ACD phone switch 12 and the Internet Web browser.

Additionally, at the same time, a manager station 60 may monitor the interchange of data and activities between a client and an agent. Such monitoring system is enabled by the Contact Server API 200 which tracks all the agent and client states.

We claim:

1. In a user support system for providing support to a user accessing a web site, a method comprising:
   receiving, via at least one of one or more of devices in the user support system, information associated with the user, the information comprising at least one of the user's name, the user's telephone number, an Internet protocol address associated with the user, or a uniform resource locator representing a web page;
   accessing, via at least one of the one or more of devices in the user support system, a web page based on the received information;
   establishing, via at least one of the one or more of devices in the user support system, a communications link with the user; and
   passing, via at least one of the one or more of devices in the user support system, events performed on the user support system to the user via the communications link to enable the user to view a same web page as that being displayed by the user support system.

2. The method of claim 1, wherein the events comprise actions performed by a user support party via the user support system.

3. The method of claim 1 further comprising:
   identifying the user support party from a plurality of user support parties based on the information associated with the user.

4. The method of claim 3, where the information associated with the user further includes a selection of one or more of a plurality of user sport service categories, and where identifying the user support party is based on the selection of the one or more of the plurality user sport service categories.

5. The method of claim 1, where the information associated with the user includes the uniform resource locator representing the web page, and where the web page is used by the user to request the support.

6. A system for providing support to a user accessing a web sit; comprising:
   at least one processing device to:
      receive information associated with the user, the information identifying the web site that the user was accessing when a request for user support was made,
      access the web site based on the received information, and
      establish a communications link with the user,
   wherein the at least one processing device includes a display device, the at least one processing device being further configured to:
      pass events to the user via the communications link to enable the user to view a same web page as that being displayed by the display device.

7. The system of claim 3, wherein the events comprise;
   actions performed by a user support party via the at least one processing device.

8. The system of claim 6, where the at least one processing device is further to:
   identify the user support party from a plurality of user support parties based on the information associated with the user.

9. The system of claim 8, where the information associated with the user further includes a selection of one or more of a plurality of user sport service categories, and where identifying the user support party is based on the selection of the one or more of the plurality user sport service categories.

10. The system of claim 6, where the information associated with the user includes a uniform resource locator associated with the web site.

11. The system of claim 6, where the communications link includes a transmission control protocol/internet protocol link.

* * * * *